(12) United States Patent
Gorohata et al.

(10) Patent No.: US 8,371,020 B2
(45) Date of Patent: Feb. 12, 2013

(54) METHOD OF MANUFACTURING STATOR COIL

(75) Inventors: Tetsuya Gorohata, Anjo (JP); Keigo Moriguchi, Takahama (JP); Akito Akimoto, Kariya (JP); Masahiro Takada, Okazaki (JP); Masaomi Dobashi, Kariya (JP); Youichi Kamakura, Anjo (JP); Shuzo Muraki, Aichi-ken (JP); Atsuo Ishizuka, Nagoya (JP)

(73) Assignee: Denso Corporation, Kariya (JP)

(*) Notice: Subject to any disclaimer, the term of this patent is extended or adjusted under 35 U.S.C. 154(b) by 157 days.

(21) Appl. No.: 12/921,943

(22) PCT Filed: Mar. 11, 2009

(86) PCT No.: PCT/JP2009/054668
§ 371 (c)(1),
(2), (4) Date: Nov. 2, 2010

(87) PCT Pub. No.: WO2009/113577
PCT Pub. Date: Sep. 17, 2009

(65) Prior Publication Data
US 2011/0041319 A1 Feb. 24, 2011

(30) Foreign Application Priority Data

Mar. 12, 2008 (JP) ................. 2008-063281
Apr. 21, 2008 (JP) ................. 2008-110793
Aug. 18, 2008 (JP) ................. 2008-210060
Mar. 9, 2009 (JP) ................. 2009-055628

(51) Int. Cl.
*H01F 7/06* (2006.01)

(52) U.S. Cl. ........... 29/606; 29/596; 29/605; 29/603.23; 29/603.24; 242/365.3; 242/365.6; 242/365.8; 242/366; 310/179; 310/198; 310/199; 310/201; 310/210

(58) Field of Classification Search ................. 29/602.1, 29/605, 606, 603.24, 603.26, 603.236; 242/365.3, 242/365.6, 365.8, 366, 328, 329, 166; 310/179, 310/184, 198, 199, 201, 210
See application file for complete search history.

(56) References Cited

U.S. PATENT DOCUMENTS
(Continued)

FOREIGN PATENT DOCUMENTS
JP 59-63940 4/1984
JP 2002-176752 6/2002
(Continued)

OTHER PUBLICATIONS

International Preliminary Report on Patentability and Written Opinion for PCT/JP2009/054668, dated Sep. 14, 2010, with English translation, 11 pages.

(Continued)

*Primary Examiner* — Paul D Kim
(74) *Attorney, Agent, or Firm* — Nixon & Vanderhye P.C.

(57) ABSTRACT

A plurality of shaped wires, which are obtained by shaping electric wires, are assembled to form a wire assembly 47. The wire assembly 47 is then rolled around a core member 6 with aligning members 7 being inserted into spaces 472 formed between adjacent ones of straight superposed parts 471 of the wire assembly 47.

9 Claims, 21 Drawing Sheets

U.S. PATENT DOCUMENTS

| | | |
|---|---|---|
| 6,376,961 B2 * | 4/2002 | Murakami et al. ............ 310/184 |
| 6,700,239 B2 * | 3/2004 | Asao et al. ...................... 310/59 |
| 7,157,826 B2 * | 1/2007 | Rajasingham ................ 310/208 |
| 7,269,888 B2 * | 9/2007 | Neet ................................ 29/596 |
| 7,679,253 B2 * | 3/2010 | Neet ............................. 310/208 |
| 2001/0019234 A1 | 9/2001 | Murakami et al. |
| 2004/0207282 A1 | 10/2004 | Ueda et al. |
| 2007/0180682 A1 | 8/2007 | Ueda et al. |
| 2009/0146523 A1 | 6/2009 | Kouda et al. |

FOREIGN PATENT DOCUMENTS

| | | |
|---|---|---|
| JP | 2004-320886 | 11/2004 |
| JP | 2009-131091 | 6/2009 |

OTHER PUBLICATIONS

International Search Report for PCT/JP2009/054668, mailed May 19, 2009.

* cited by examiner (A)

(B)

(A)

(B)

ALIGNING ARROW OPERATING RANGE

METHOD OF MANUFACTURING STATOR COIL

This application is the U.S. national phase of International Application No. PCT/JP2009/054668 filed 11 Mar. 2009, which designated the U.S. and claims priority to Japan Application No(s). 2008-063281 filed, 12 Mar. 2008, 2008-110793 filed 21 Apr. 2008, 2008-210060 filed 18 Aug. 2008 and 2009-055628 filed 9 Mar. 2009, the entire contents of each of which are hereby incorporated by reference.

TECHNICAL FIELD

The present invention relates to methods of manufacturing stator coils and, more particularly, to a method of manufacturing a stator coil for a stator of an electric rotating machine.

BACKGROUND ART

In recent years, electric rotating machines, which are used as electric motors and electric generators, have been required to be compact, be able to output high power, and have high quality.

For example, for electric rotating machines for use in motor vehicles, the spaces available for installation of those machines in the motor vehicles have been decreasing, while the need for them to output high power has been increasing.

As a conventional electric rotating machine, there are known ones in which a stator coil used in a stator is formed of continuous windings (for example, Patent Documents 1 and 2).

Patent Document 1: Japanese Patent Application Publication No. 2002-176752

Patent Document 2: Japanese Patent Application Publication No. 2004-320886

DISCLOSURE OF THE INVENTION

Problems to be Solved by the Invention

As a method of manufacturing a stator coil that is comprised of continuous windings, there is known the following method.

First, electric wires are shaped to form shaped wires each of which includes a plurality of straight portions parallel to each other and a plurality of turn portions connecting the straight portions. Then, the shaped wires are assembled to form a wire assembly. The wire assembly includes shaped-wire pairs each of which has, in the longitudinal direction of the wire assembly, a plurality of straight superposed parts that are formed by superposing the straight portions of one shaped wire of the shaped-wire pair respectively on those of the other. Therefore, in the wire assembly, the straight superposed parts of the shaped-wire pairs are arranged in the longitudinal direction of the wire assembly in parallel with each other. Next, the wire assembly is rolled around a core member by a predetermined number of turns, forming a rolled wire assembly. The rolled wire assembly has, in its circumferential direction, a plurality of straight stacked parts each of which is formed by stacking a plurality of the straight superposed parts of one of the shaped-wire pairs in a radial direction of the rolled wire assembly.

The thus-obtained rolled wire assembly makes up a stator coil by disposing the straight stacked parts respectively in the slots of a stator core with the turn portions of the shaped wires disposed outside of the slots.

However, with the above manufacturing method, during the rolling of the wire assembly around the core member, it is easy for the straight portions in each of the straight superposed parts to be out of superposition; it is also easy for the intervals between adjacent ones of the straight superposed parts to become uneven. Consequently, in the resultant rolled wire assembly, the straight portions in each of the straight stacked parts may be out of superposition; the intervals between adjacent ones of the straight stacked parts may be uneven. As a result, after the straight stacked parts are respectively disposed in the slots of the stator core, the accuracy of alignment of the straight portions in each of the slots may be low; the intervals (or pitches) between adjacent ones of the straight stacked parts may be uneven. Further, the low accuracy of alignment of the straight portions and the uneven pitches will cause both the slot occupation ratio in the stator and the output of the electric rotating machine which employs the stator to be lowered.

The present invention has been made in view of the above circumstances and aims to solve the technical problem of improving both the accuracy of alignment of the straight portions in each of the straight stacked parts of the rolled wire assembly and the accuracy of the pitches between adjacent ones of the straight stacked parts during the manufacture by rolling of a stator coil that is comprised of phase windings formed of continuous windings.

Means for Solving Problems

The present invention, which has been made to solve the above technical problem, provides a method of manufacturing a stator coil that is comprised of a plurality of phase windings. The method includes: a shaping step for shaping electric wires to form a plurality of shaped wires; an assembling step for assembling the plurality of shaped wires to form a wire assembly; and a rolling step for rolling the wire assembly around a core member to form a rolled wire assembly. The method is characterized in that: each of the shaped wires includes a plurality of straight portions, which extend parallel to each other and are arranged in a longitudinal direction of the wire assembly, and a plurality of turn portions that connect, alternately on opposite sides of the straight portions, adjacent ones of the straight portions; the shaped wires have, in the longitudinal direction of the wire assembly, a plurality of straight superposed parts each of which is formed by superposing a pair of the straight portions of the shaped wires; the rolled wire assembly obtained in the rolling step has, in a circumferential direction of the rolled wire assembly, a plurality of straight stacked parts each of which is formed by stacking a predetermined number of the straight superposed parts in a radial direction; and in the rolling step, the wire assembly is rolled around the core member with aligning members being sequentially inserted into spaces formed between adjacent ones of the straight superposed parts of the wire assembly to secure the superposition of the straight portions in each of the straight superposed parts and make intervals between adjacent ones of the straight superposed parts even.

Here, the aligning members may be inserted into the spaces formed between adjacent ones of the straight superposed parts of the wire assembly from the outer side in the radial direction (i.e., the radial direction of the core member). Alternatively, the aligning members may also be inserted into the spaces from the inner side in the radial direction (e.g., by protruding the aligning members from the core member radially outward).

According to the above constitution, in the rolling step of the stator coil manufacturing method of the present invention, the wire assembly is rolled around the core member with the aligning members being sequentially inserted, either from the radially outer side or from the radially inner side, into the spaces formed between adjacent ones of the straight superposed parts of the wire assembly. Consequently, with the aligning members, it is possible to secure the superposition of the straight portions in each of the straight superposed parts of the wire assembly and thereby align the straight portions in the superposing direction; it is also possible to make the intervals between adjacent ones of the straight superposed parts even. As a result, it is possible to align the straight portions in each of the straight stacked parts, which are arranged in the circumferential direction of the rolled wire assembly, in a radial direction of the rolled wire assembly; it is also possible to make the intervals between circumferentially-adjacent ones of the straight stacked parts even.

It is preferable that: in the rolling step, the wire assembly is rolled around the core member by a plurality of turns to form the rolled wire assembly; and the aligning members are stacked in each of the spaces in stages by inserting, from the radially outer side of the core member, one of the aligning members into each of the spaces for each turn of the rolling of the wire assembly.

According to the above constitution, for each turn of the rolling of the wire assembly around the core member, it is possible to align, with the aligning members, the straight portions in the straight superposed parts of the wire assembly in the respective superposing directions (or respective radial directions of the rolled wire assembly); it is also possible to make, with the aligning members, the intervals between adjacent ones of the straight superposed parts even. Further, it is possible to align all the straight portions in each of the straight stacked parts of the rolled wire assembly in the radial direction of the rolled wire assembly.

It is preferable that: in the rolling step, the wire assembly is rolled around the core member by a plurality of turns to form the rolled wire assembly; and each of the aligning members is protruded, from the core member radially outward, into one of the spaces for each turn of the rolling of the wire assembly, thereby being inserted into the one of the spaces in stages.

According to the above constitution, for each turn of the rolling of the wire assembly around the core member, it is possible to align, with the aligning members, the straight portions in the straight superposed parts of the wire assembly in the respective superposing directions (or respective radial directions of the rolled wire assembly); it is also possible to make, with the aligning members, the intervals between adjacent ones of the straight superposed parts even. Further, it is possible to align all the straight portions in each of the straight stacked parts of the rolled wire assembly in the radial direction of the rolled wire assembly.

It is preferable that: each of the aligning members is made up of at least one aligning arrow that is protruded from an outer circumferential surface of the core member radially outward to abut that side surface of a corresponding one of the straight superposed parts which is on the backward side in the rolling direction of the wire assembly.

According to the above constitution, by restraining, among all the side surfaces of the straight superposed parts, at least those side surfaces which are on the backward side in the rolling direction using the aligning arrows, it is possible to align the straight portions in each of the straight supposed parts in the superposing direction and make the intervals between adjacent ones of the straight superposed parts even.

Further, as the aligning arrows that protrude from the outer circumferential surface of the core member radially outward to restrain the side surfaces of the straight superposed parts, it is preferable to employ pairs of aligning arrows to retrain both the side surfaces of each of the straight superposed parts respectively on the forward and backward sides in the rolling direction. Consequently, it is possible to sandwich each of the straight superposed parts in the circumferential direction of the rolled wire assembly using one of the pairs of the aligning arrows, thereby aligning the straight portions in each of the straight supposed parts in the superposing direction and making the intervals between adjacent ones of the straight superposed parts even.

It is preferable that: each of the aligning members is made up of a taper pin that is tapered so as to extend in width radially outward; and the taper pin is protruded from the core member radially outward while rotating for each turn of the rolling of the wire assembly.

According to the above constitution, by inserting, into each of the spaces formed between adjacent ones of the straight superposed parts, one of the taper pins and thereby bringing each facing pair of the side surfaces of the straight stacked parts respectively into abutment with the side surfaces of one of the taper pins, it is possible to align the straight portions in each of the straight supposed parts in the superposing direction and make the intervals between adjacent ones of the straight superposed parts even. In addition, compared to the case of employing the pairs of the aligning arrows to align the straight portions, it is possible to simplify the structure of the aligning members.

It is preferable that: in the rolling step, when the wire assembly is on its way to be fed to the core member, a plurality of pre-aligning members are respectively inserted into consecutive ones of the spaces formed between adjacent ones of the straight superposed parts of the wire assembly to secure the superposition of the straight portions in each of those straight superposed parts which are each sandwiched by an adjacent pair of the pre-aligning members.

According to the above constitution, when the wire assembly is on its way to be fed to the core member, the pre-aligning members are respectively inserted into consecutive ones of the spaces formed between adjacent ones of the straight superposed parts of the wire assembly. Therefore, in the case of the pre-aligning members being respectively inserted into at least two consecutive spaces, it is possible to at secure the superposition of the straight portions in each of those straight superposed parts which are each sandwiched by an adjacent pair of the pre-aligning members, thereby preliminarily aligning the straight portions in the superposing direction. Consequently, in the rolled wire assembly obtained by rolling the wire assembly, it is possible to improve at least the accuracy of alignment of the straight portions in each of the straight stacked parts in the radial direction of the rolled wire assembly. Moreover, in the case of the pre-aligning members being respectively inserted into at least three consecutive spaces, it is possible to secure the superposition of the straight portions in each of those straight superposed parts which are each sandwiched by an adjacent pair of the pre-aligning members, thereby preliminarily aligning the straight portions in the superposing direction; moreover it is also possible to preliminarily make the spaces between adjacent ones of the straight superposed parts even. Consequently, in the rolled wire assembly obtained by rolling the wire assembly, it is possible to improve the accuracy of the pitches between adjacent ones of the straight stacked parts as well as the accuracy of alignment of the straight portions in each of the straight stacked parts in the radial direction of the rolled wire assembly.

It is preferable that: the rolling step is a continuous rolling step for rolling the wire assembly around the core member while continuously feeding the wire assembly to the core member; and in the continuous rolling step, the pre-aligning members are advanced into and retreated out of the spaces while being moved in synch with the wire assembly.

According to the above constitution, when the rolled wire assembly is formed by the continuous rolling step, it is possible to improve both the accuracy of alignment of the straight portions in each of the straight stacked parts and the accuracy of the pitches between adjacent ones of the straight stacked parts.

It is preferable that: the rolling step is a pitch-based rolling step for rolling the wire assembly around the core member while feeding the wire assembly to the core member by N times the interval between an adjacent pair of the straight superposed parts of the wire assembly at a time, where N is a natural number; and in the pitch-based rolling step, a plurality of processes are repeated which include a pre-aligning member insertion process for inserting the pre-aligning members into the spaces of the wire assembly when the wire assembly is sopped, an advancing process for advancing the wire assembly together with the pre-aligning members by N times the interval between an adjacent pair of the straight superposed parts of the wire assembly, a pre-aligning member removal process for removing the pre-aligning members out of the spaces of the wire assembly, and a retreating process for retreating the pre-aligning members by N times the interval between an adjacent pair of the straight superposed parts of the wire assembly.

According to the above constitution, when the rolled wire assembly is formed by the pitch-based rolling step, it is possible to improve both the accuracy of alignment of the straight portions in each of the straight stacked parts and the accuracy of the pitches between adjacent ones of the straight stacked parts.

It is further preferable that: in the pitch-based rolling process, a position keeping member insertion process is performed, following the advancing process, for inserting position keeping members into other ones of the spaces of the wire assembly than those of the spaces in which the pre-aligning members are inserted; a position keeping member removal process is performed, following the pre-aligning member insertion process, for removing the position keeping members out of the other spaces of the wire assembly; the pre-aligning member removal process, the retreating process, and the pre-aligning member insertion process are performed with the position keeping members inserted in the other spaces of the wire assembly; and the advancing process is performed with the position keeping members removed out of the other spaces of the wire assembly.

According to the above constitution, when the rolled wire assembly is formed in the pitch-based rolling step, the pre-aligning members are first inserted into the spaces of the wire assembly to pre-align the straight portions in the straight superposed parts, and then the wire assembly is fed to the core member by N pitches. Further, with the pre-aligning members inserted in the spaces of the wire assembly, the position keeping members are inserted into other spaces of the wire assembly. Furthermore, with the position of the wire assembly kept by the position keeping members, the pre-aligning members are removed from the wire assembly. After that, the removed pre-aligning members are retreated by N pitches and then inserted into the next spaces. Therefore, it is possible to easily insert the pre-aligning members into the next spaces.

Effects of the Invention

Accordingly, with the stator coil manufacturing method of the present invention, during the manufacture by rolling of a stator coil that is comprised of phase windings formed of continuous windings, it is possible to improve both the accuracy of alignment of the straight portions in each of the straight stacked parts of the rolled wire assembly and the accuracy of the pitches between adjacent ones of the straight stacked parts.

Consequently, applying a stator coil manufactured by the stator coil manufacturing method of the present invention to a stator of an electric rotating machine, it is possible to reliably dispose the straight stacked parts of the rolled wire assembly respectively in the slots of a stator core, thereby improving both the slot occupation ratio in the stator and the output of the electric rotating machine.

In addition, the straight stacked parts of the rolled wire assembly can be easily disposed in the respective slots of the stator core, thereby improving the productivity of the stator.

DESCRIPTION OF REFERENCE CHARACTERS

Figure 1:
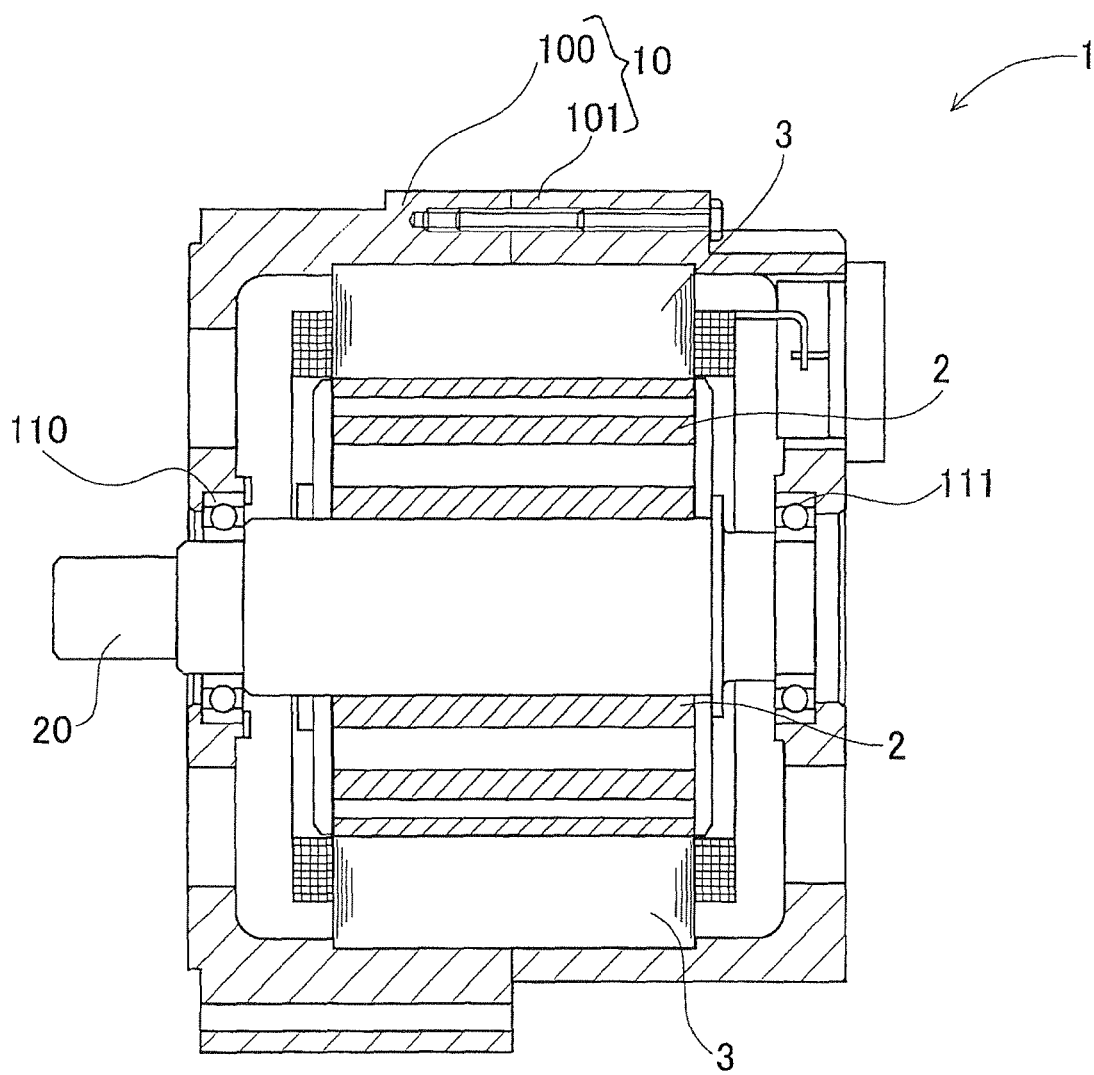
FIG. 1 is a schematic axial cross-sectional diagram illustrating the configuration, of an electric rotating machine according to the first embodiment.

1: Electric rotating machine
3: Stator
30: Stator core
31a, 31b: slots
4: Stator coil
43: Slot-accommodated portions
47: Wire assembly
48: Rolled wire assembly
431: Straight portions
441: Turn portions
471: Straight superposed parts
472: Spaces
481: Straight stacked parts
6: Core member
7: Aligning members
71: First aligning pieces
72: Second aligning pieces
73: Third aligning pieces
74: Aligning arrows
76: Flattened taper pins
77: Aligning arrows
78: Post-aligning jigs
81: Pre-aligning members
91: Position keeping members

BEST MODES OF IMPLEMENTING THE INVENTION

Hereinafter, embodiments, which embody stator coil manufacturing methods of the present invention, will be described in detail. It should be noted that those embodiments are to be described only as examples and stator coil manufacturing methods of the present invention are not limited to those embodiments. Stator coil manufacturing methods of the present invention may also be implemented in various other modes resulting from modifications and improvements which may be made by a person skilled in the art to those embodiments without departing from the spirit of the invention.

First Embodiment

First, the configuration of an electric rotating machine 1, which employs a stator coil manufactured by a stator coil manufacturing method of the present embodiment, will be described.

As shown in FIG. 1, the electric rotating machine 1 includes: a housing 10 that is formed by joining a pair of housing pieces 100 and 101, each of which has a substantially bottomed cylindrical shape, at the open ends thereof; a rotating shaft 10 that is rotatably supported by the housing 10 via bearings 110 and 111; a rotor 2 fixed on the rotating shaft 20; and a stator 3 that is fixed to the housing 10 in such a position inside the housing 10 as to surround the rotor 2.

The rotor 2 has a plurality of magnetic poles formed on a radially outer periphery of the rotor 2 facing a radially inner periphery of the stator 3; the magnetic poles are made up of permanent magnets so as to be alternately different in the circumferential direction of the rotor 2. The number of the magnetic poles is dependent on the design specification of the electric rotating machine 1, and thus not limited to a specific number. In the present embodiment, the rotor 2 has eight magnetic poles (i.e., four N poles and four S poles).

Figure 2:
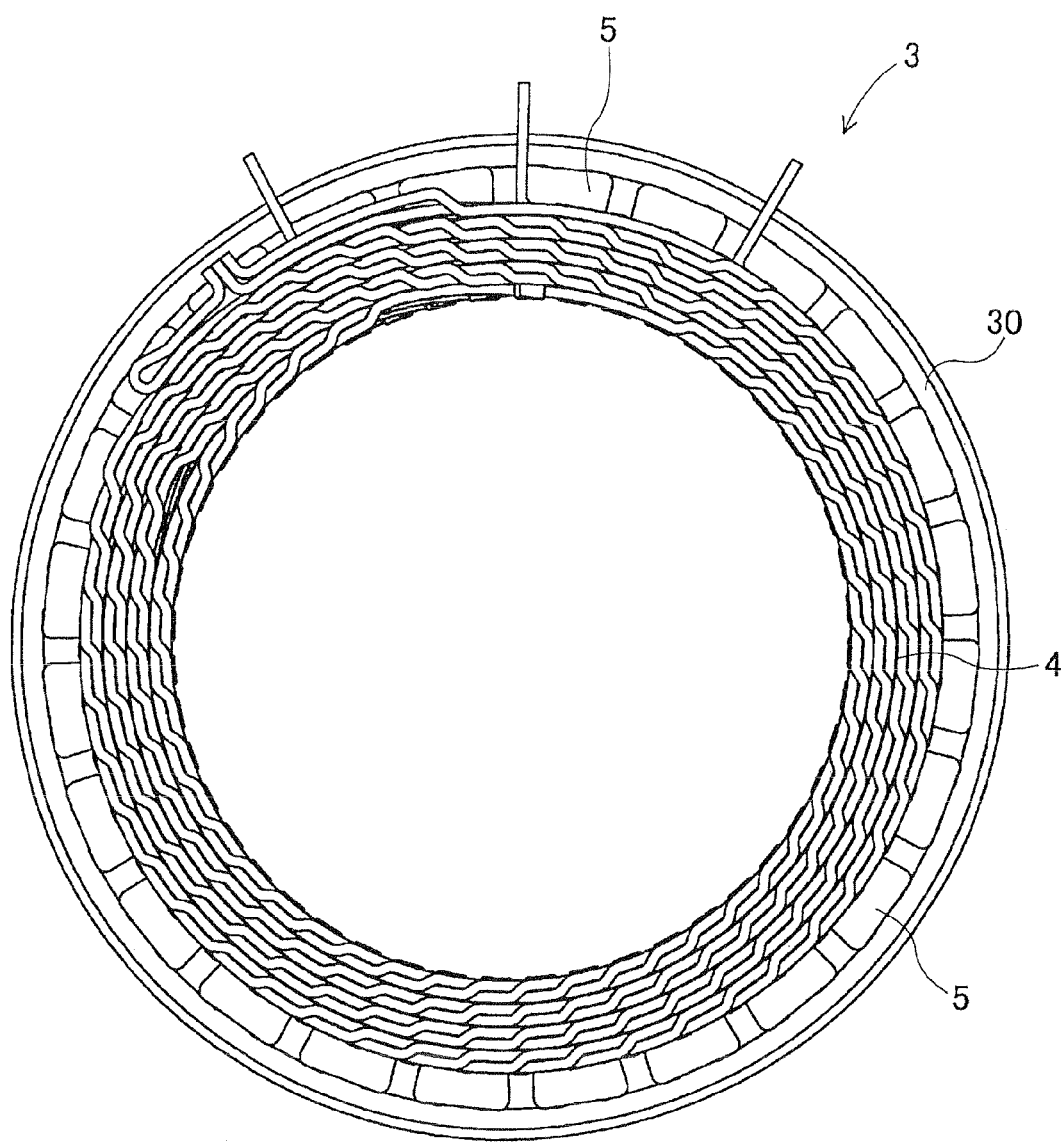
FIG. 2 is a plan view of a stator according to the first embodiment.

The stator 3 includes, as shown in FIG. 2, a stator core 30, a three-phase stator coil 4 comprised of a plurality of phase windings, and insulating paper 5 interposed between the stator core 30 and the stator coil 4.

Figure 3:
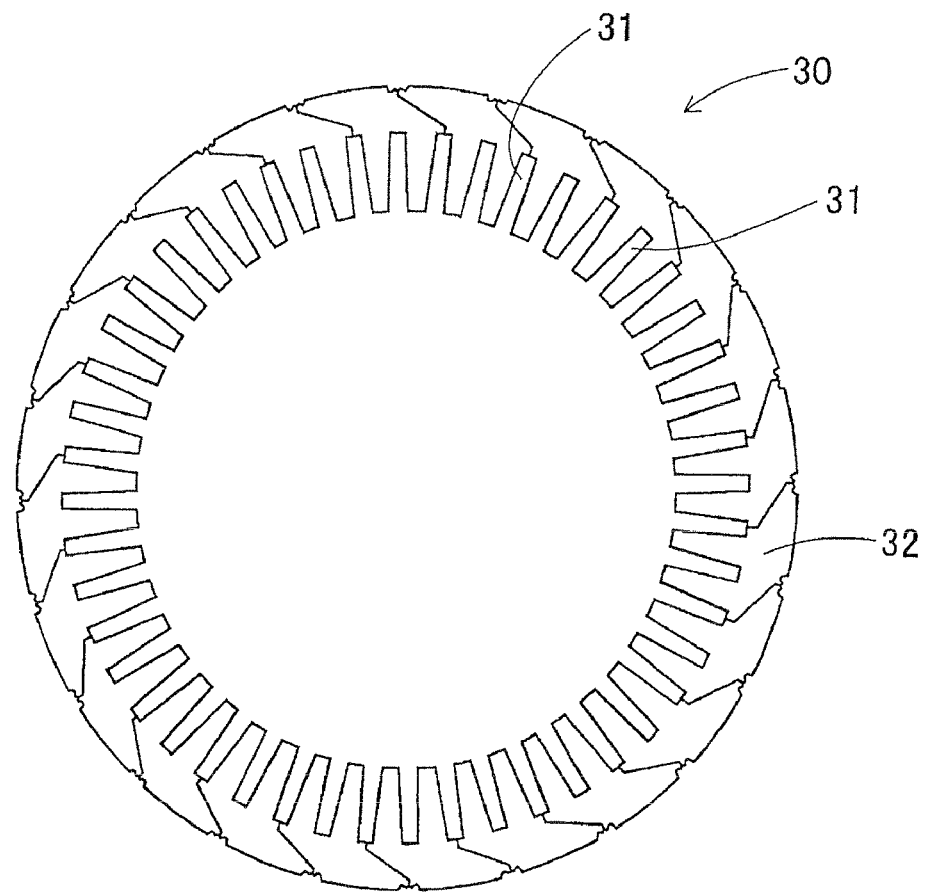
FIG. 3 is a plan view of a stator core according to the first embodiment.

The stator core 30 has, as shown in FIG. 3, an annular shape with a plurality of slots 31 formed in the inner circumference thereof. Each of the slots 31 is so formed that the depth-wise direction of the slot 31 is coincident with a radial direction of the stator core 30. The number of the slots 31 formed in the stator core 30 is, with respect to the number of the magnetic poles of the rotor 2, two per phase of the stator coil 4. Accordingly, in the present embodiment, the number of the slots 31 is 8×3×2=48.

Figure 4:
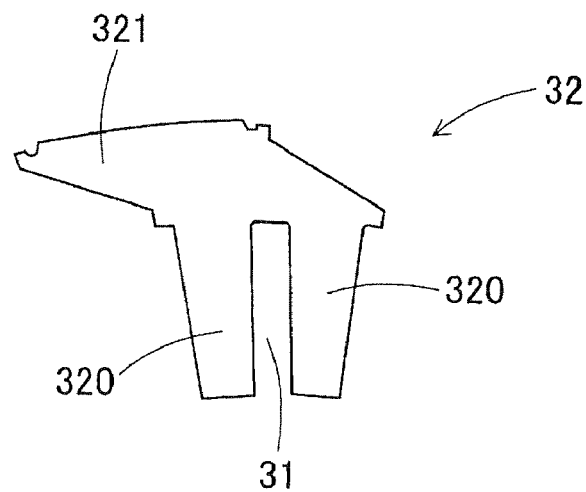
FIG. 4 is a plan view of a laminated core segment according to the first embodiment.

The stator core 30 is formed by connecting, in its circumferential direction, a predetermined number of (e.g., 24 in the present embodiment) core segments 32 as shown in FIG. 4. Each of the core segments 32 defines therein one of the slots 31. Moreover, each circumferentially-adjacent pair of the core segments 32 together defines another one of the slots 31 therebetween. Specifically, each of the core segments 32 has a pair of tooth portions 320 that extend radially inward and a back core portion 321 that is located radially outward of the tooth portions 320 to connect them.

Each of the core segments 32 making up the stator core 30 is formed by laminating 410 magnetic steel sheets having a thickness of 0.3 mm. In addition, between the laminated steel sheets, there are interposed insulating films. Each of the core segments 32 making up the stator core 30 may be formed not only by using the lamination of the magnetic steel sheets but also by using metal sheets conventionally well-known in the art and insulating films.

Figure 5:
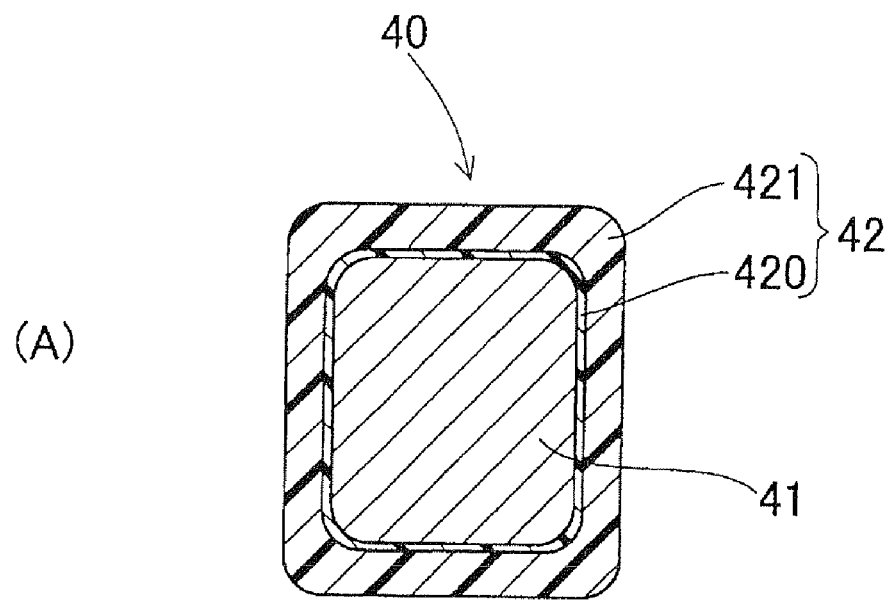
FIG. 5 are cross-sectional views of a winding for forming a stator coil according to the first embodiment.
Figure 5:
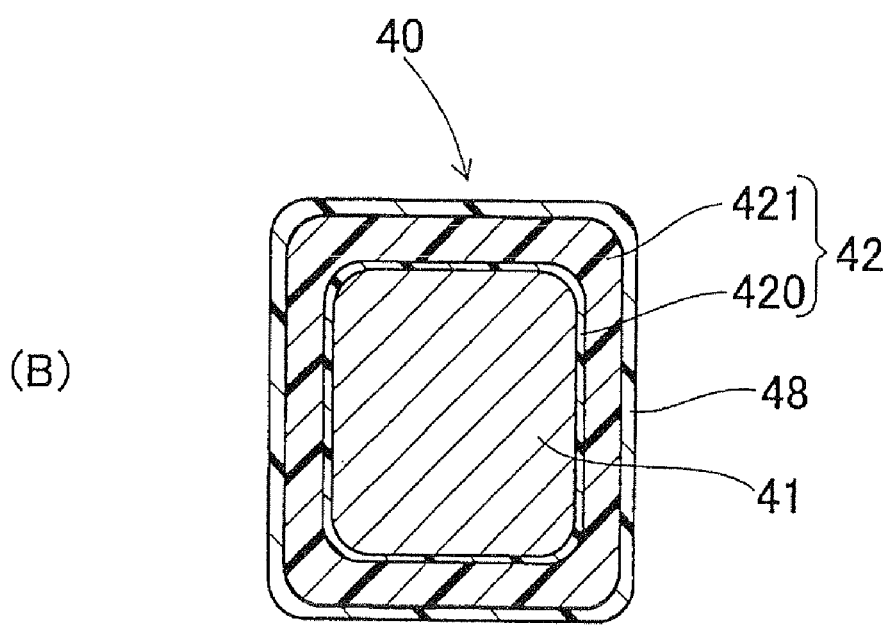

The stator coil 4 is comprised of a plurality of windings 40 wound in a predetermined winding manner. As shown in FIG. 5(A), each of the windings 40 making up the stator coil 4 is comprised of a copper-made electric conductor 41 and an insulating coat 42 that covers the outer periphery of the electric conductor 41 to electrically insulate it. The insulating coat 42 is comprised of an inner layer 420 and an outer layer 421. The thickness of the insulating coat 42 including the inner and outer layers 420 and 421 is set to be in the range of 100 μm to 200 μm. Consequently, with such a large thickness of the insulating coat 42, it is unnecessary to interpose insulating paper between the windings 40 for the purpose of electrically insulating the windings 40 from one another. However, it is also possible to interpose insulating paper between the windings 40 or between the stator core 30 and the stator coil 4 as shown in FIG. 2.

Furthermore, as shown in FIG. 5(B), each of the windings 40 of the stator coil 4 may also be formed by coating the outer periphery of the insulating coat 42, which is comprised of the inner and outer layers 420 and 421, with a fusible material 48 such as epoxy resin. In this case, the fusible material 48 will be fused by the heat generated in the electric rotating machine 1 earlier than the insulating coat 42. Consequently, those of the windings 40 which are disposed in the same ones of the slots 31 will be heat-bonded together by the fusible material 48. As a result, those of the windings 40 which are disposed in the same ones of the slots 31 will be integrated into a rigid body, thereby enhancing the mechanical strength of those windings 40 inside the slots 31.

Figure 6:
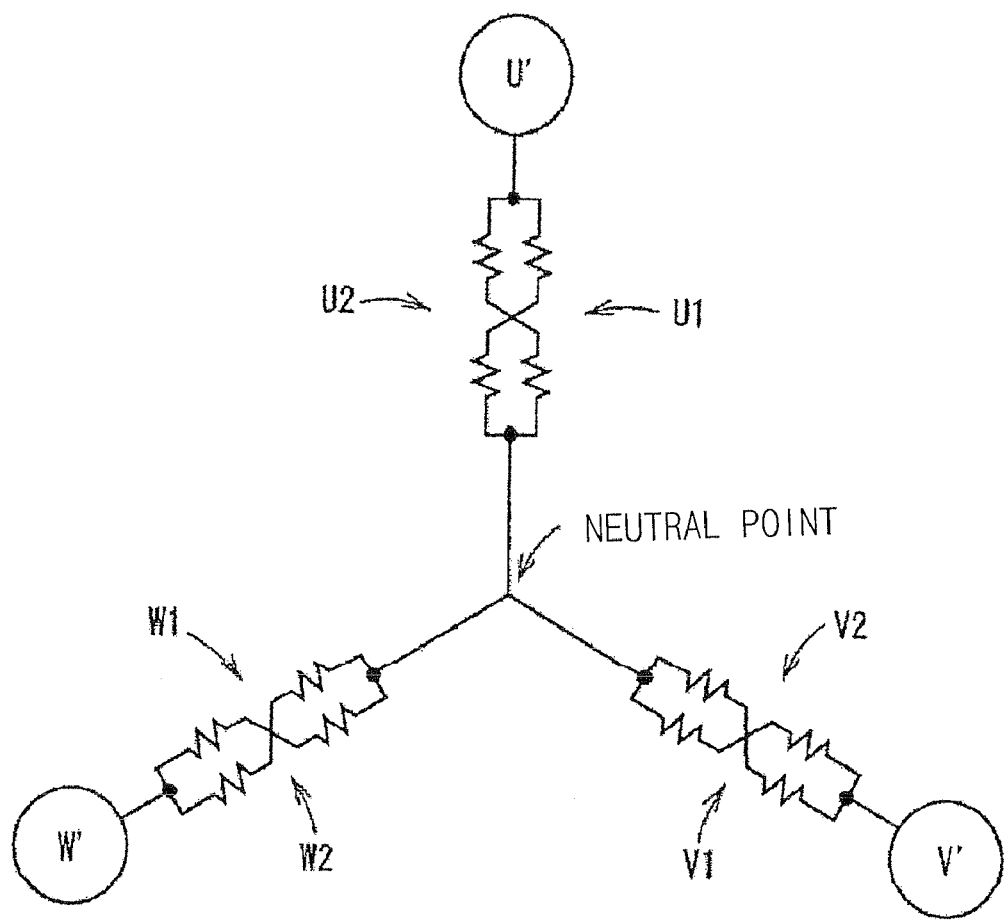
FIG. 6 is a diagram illustrating the connection of the stator coil according to the first embodiment.

The stator coil 4 is, as shown in FIG. 6, comprised of windings (U1, U2, V1, V2, W1, and W2), two for each of the three phases.

Figure 7:
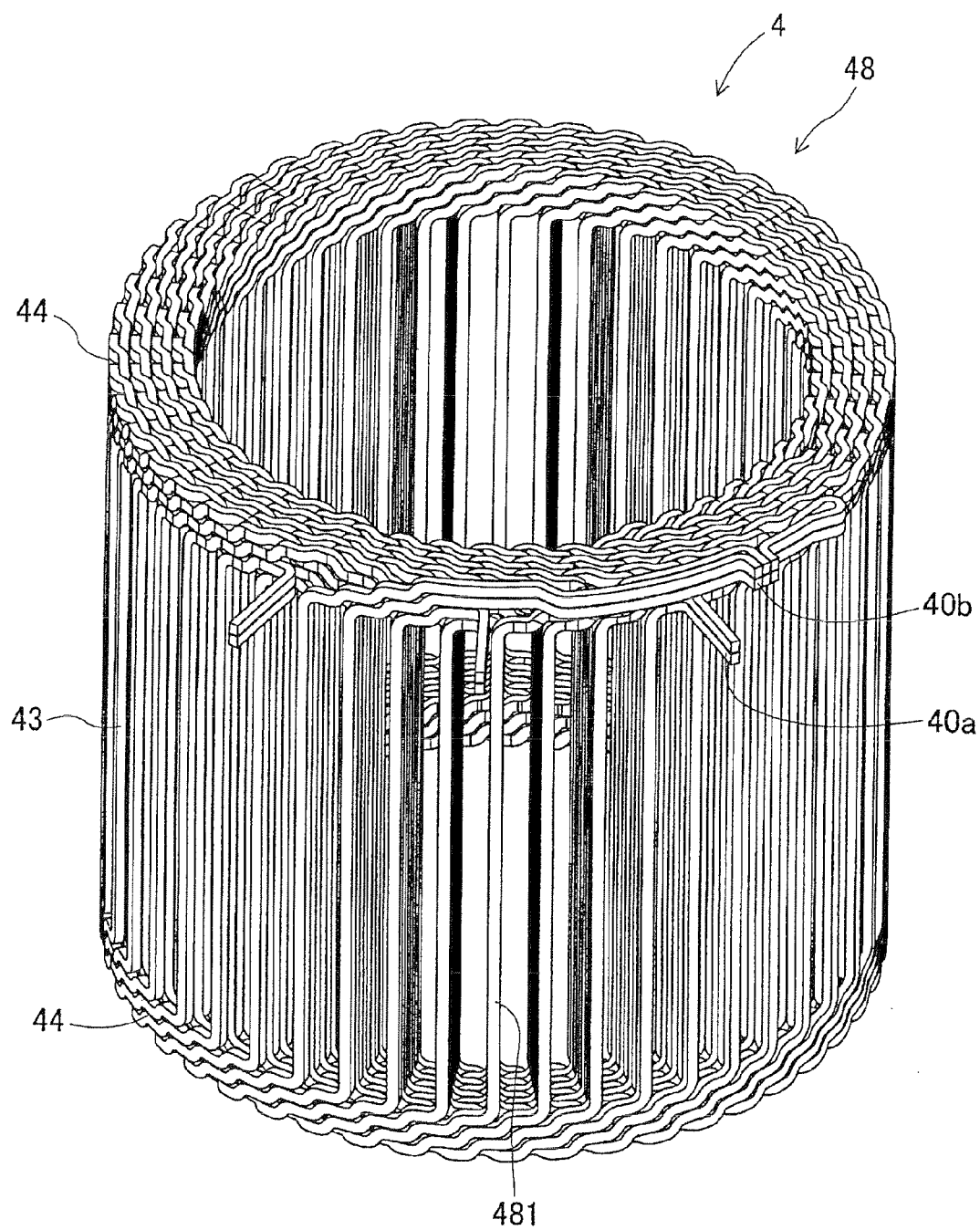
FIG. 7 is a perspective view of a rolled wire assembly which makes up the stator coil according to the first embodiment.

The stator coil 4 is, as shown in FIG. 7, formed by winding the plurality of windings 40 into a predetermined shape. Each of the windings 40 making up the stator coil 4 is shaped so as to be wave-wound along the circumferential direction on the inner periphery side of the stator core 30.

Each of the windings 40 making up the stator coil 4 includes straight slot-accommodated portions 43, which are accommodated in the slots 31 of the stator core 30, and turn portions 44 each of which connects an adjacent pair of the slot-accommodated portions 43. The slot-accommodated portions 43 are accommodated in one of every a predetermined number of (e.g., 3×2=6 in the present embodiment) slots 31. Each of the turn portions 44 is formed to protrude from an axial end face of the stator core 30.

The stator coil 4 is formed by protruding the ends of the plurality of windings 40 from the axial end faces of the stator core 30 and winding the plurality of windings 40 along the circumferential direction in a wave shape. Each phase of the stator coil 4 is formed by joining ends of first and second winding portions 40a and 40b by welding. In other words, each phase of the stator coil 4 is made up of a shaped-wire pair that is formed by joining ends of two shaped wires obtained by shaping two electric wires. The slot-accommodated portions 43 of the first winding portion 40a are accommodated in the same slots 31 as those of the second winding portion 40b. Further, in each of those slots 31, the slot-accommodated portions 43 of the first winding portion 40 are alternately positioned with the slot-accommodated portions 43 of the second winding portion 40b in the depth-wise direction of the slot 31. Moreover, a joining portion 45 between the first and second winding portions 40a and 40b is formed in a turn-back portion 46 which is made up of that one of the slot-accommodated portions 43 where the winding direction of the first winding portion 40a is reversed to the winding direction of the second winding portion 40b.

Figure 8:
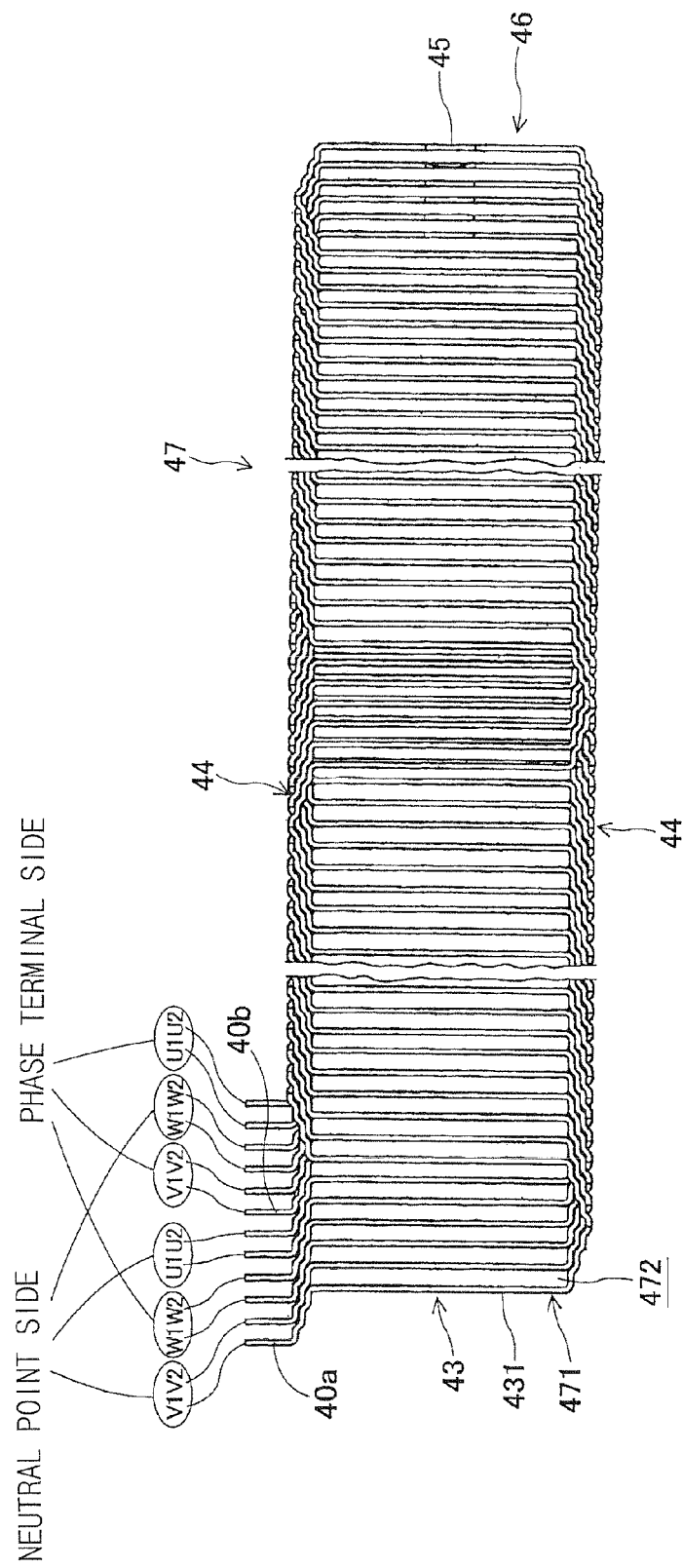
FIG. 8 is a development of the stator coil as well as is a plan view of a wire assembly according to the first embodiment.
Figure 9:
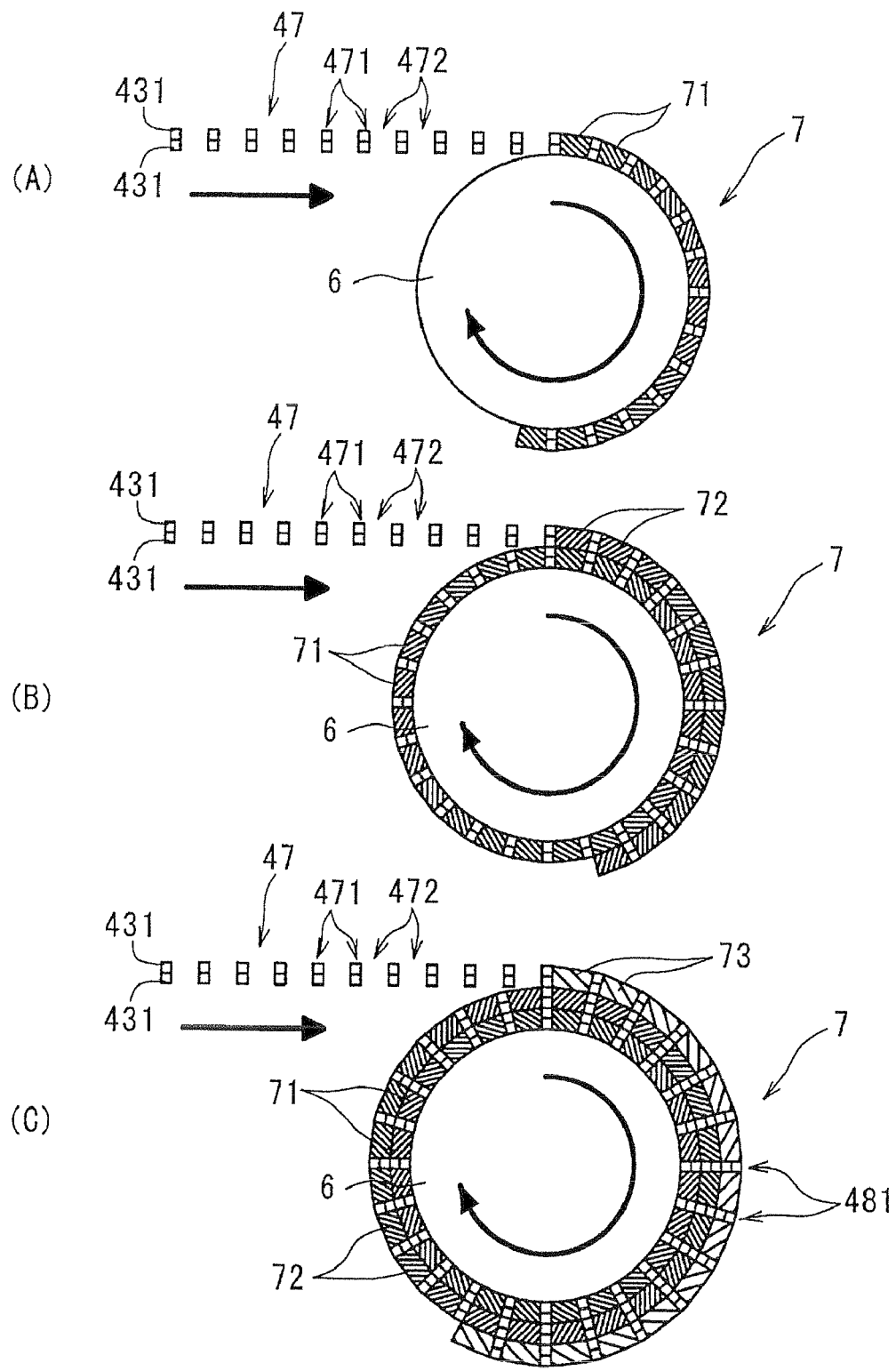
FIG. 9 are schematic diagrams illustrating a stator coil manufacturing method according to the first embodiment.

As a development of the stator coil 4, i.e. a plan view of an assembly 47 before being rolled to form the stator coil 4, is shown in FIG. 8, the stator coil 4 includes six shaped-wire pairs each of which is comprised of a first winding portion 40a and a second winding portion 40b; the first and second winding portions 40a and 40b are wound in opposite directions. With the six shaped-wire pairs, the stator coil 4 is formed as a coil of 3 phases (U, V, W)×2 (double slots). For each of the shaped-wire pairs, the end of the first winding portion 40a on the opposite side to the neutral point (or to the phase terminal) is connected to the end of the second winding portion 40b on the opposite side to the terminal phase (or to the neutral point) via that slot-accommodated portion 43 which makes up the turn-back portion 46. In addition, the modes of connection are the same for all the windings 40.

Hereinafter, the stator coil manufacturing method of the present embodiment will be described. Specifically, the stator coil 4 is manufactured as follows.

It should be noted that in the following description, a radial direction denotes a radial direction of a core member or a rolled wire assembly while the circumferential direction denotes the circumferential direction of the core member or the rolled wire assembly.

<Shaping Process>

First, twelve electric wires are shaped to form twelve shaped wires. Each of the shaped wires obtained by this process includes a plurality of straight portions 431, which extend parallel to each other and are arranged in the longitudinal direction of the shaped wire, and a plurality of turn portions 44 that connect, alternately on opposite sides of the straight portions 431, adjacent ones of the straight portions 41.

<Assembling Process>

The twelve shaped wires are assembled to form a wire assembly 47, in which six shaped-wire pairs are arranged in the longitudinal direction of the wire assembly 47.

Each of the shaped-wire pairs is comprised of a first wire portion making up the first winding portion 40a and a second wire portion making up the second winding portion 40b. In addition, the first wire portion is formed of one of the shaped wires, and the second wire portion is formed of another one of the shaped wires.

For each of the shaped-wire pairs, one end of the first wire portion is joined, by welding, to one end of the second wire portion, thereby forming a joining portion 45. In addition, it is possible to first assemble the twelve shaped wires and then join the ends of the first and second wire portions for each of the shaped-wire pairs; alternatively, it is also possible to first join the ends of the first and second wire portions to form the six shaped-wire pairs and then assemble the six shaped-wire pairs.

Each of the shaped-wire pairs in the wire assembly 47 has, in the longitudinal direction of the wire assembly 47, a plurality of straight superposed parts 471 that are formed by superposing the straight portions 431 of the first wire portion respectively on those of the second wire portion.

<Rolling Process>

The wire assembly 47 is rolled, with the turn-back portions 46 positioned on the center side, by a predetermined number of (e.g., 3 or 4) turns, forming a rolled wire assembly 48. The rolling of the wire assembly 47 is performed while plastically deforming the turn portions 44 of the wire assembly 47 into a predetermined rolling radius. In addition, it is possible to bend and thereby shape the turn portions 44 using a shaping die that has a shaping surface with a predetermined bending radius or using a predetermined shaping roller.

The rolled wire assembly 48 has, in its circumferential direction, a plurality of straight stacked parts 481 each of which is formed by stacking a plurality of the straight superposed parts 471 of one of the shaped-wire pairs in a radial direction. Here, the number of the straight superposed parts 471 stacked in each of the straight stacked parts 481 is equal to the predetermined number of turns by which the wire assembly 47 is rolled to form the rolled wire assembly 48. Accordingly, in each of the straight stacked parts 481, the number of the straight portions 431 which are superposed and aligned in the radial direction is double the predetermined number of turns. In addition, the straight stacked parts 481 are positioned in the circumferential direction of the rolled wire assembly 48 with small spaces formed therebetween.

With respect to the thus-obtained rolled wire assembly 48, the tooth portions 320 of the core segments 32 are respectively inserted, from the radially outer side, into the spaces formed between adjacent ones of the straight stacked parts 481. Then, adjacent ones of the core segments 32 are joined together, forming the stator 3.

Next, the rolling process in the stator coil manufacturing method of the first embodiment will be described in detail with reference to FIGS. 9-12.

The rolling process in the stator coil manufacturing method of the first embodiment is a pitch-based rolling process. In this pitch-based rolling process, the wire assembly 47 is rolled around a cylindrical core member (or core bar) 6 while being fed to the core member 6 by, for example, one pitch (i.e., the interval between an adjacent pair of the straight superposed parts 471 of the wire assembly 47) at a time. Moreover, the rolling of the wire assembly 47 around the core member 6 is performed with aligning members 7 being sequentially inserted into the spaces 472 formed between adjacent ones of the straight superposed parts 471 of the wire assembly 47. More specifically, each of the aligning members 7 is inserted, when both the feeding of the wire assembly 47 and the rotation of the core member 6 are stopped, into the space 472 between those two of the straight superposed parts 471 which have just started to be rolled around the core member 6.

The rotation (i.e., the rotation in the clockwise direction in FIG. 9) of the core member 6 and the feeding of the wire assembly 47 to the core member 6 through a horizontal movement (i.e., the horizontal movement from the left to the right in FIG. 9) may be carried out by using well-known driving devices (not shown) and a control device (not shown) for controlling the driving devices.

The wire assembly 47 is rolled around the core member 6 by, for example, three or four turns to form the rolled wire assembly 48. Consequently, by inserting, from the radially outer side of the core member 6, one of the aligning members 7 into each of the spaces 472 for each turn of the rolling of the wire assembly 47, the aligning members 7 are stacked in each of the spaces 472 in stages.

In the stator coil manufacturing method of the first embodiment, first aligning pieces 71, second aligning pieces 72, and third aligning pieces 73 are employed as the aligning members 7. Each of the first aligning pieces 71 is inserted into one of the spaces 472 during the first turn and held by the core member 6. Each of the second aligning pieces 72 is inserted into one of the spaces 472 during the second turn, stacked on the first aligning piece 71 in the space 472, and held by the core member 6. Each of the third aligning pieces 73 is inserted into one of the spaces 472 during the third turn, stacked on the second aligning piece 72 in the space 472, and held by the core member 6. The numbers of the first to third aligning pieces 71-73 are dependent on the number of the straight stacked parts 481 in the rolled wire assembly 48.

In addition, it is possible to increase the number of the aligning pieces stacked in each of the spaces 472 according to the predetermined number of turns for the rolling of the wire assembly 47. Moreover, it is possible to configure the second aligning pieces 72 to be respectively held by the first aligning pieces 71 instead of by the core member 6. Similarly, it is also possible to configure the third aligning pieces 73 to be respectively held by the second aligning pieces 72 instead of by the core member 6.

As the wire assembly 47 is rolled around the core member 6, each of the spaces 472 comes to have a shape of expanding radially outward. Therefore, each of the first to third aligning pieces 71-73 is configured to have a trapezoidal cross-sectional shape conforming to the shape of the spaces 472 expanding radially outward.

Figure 10:
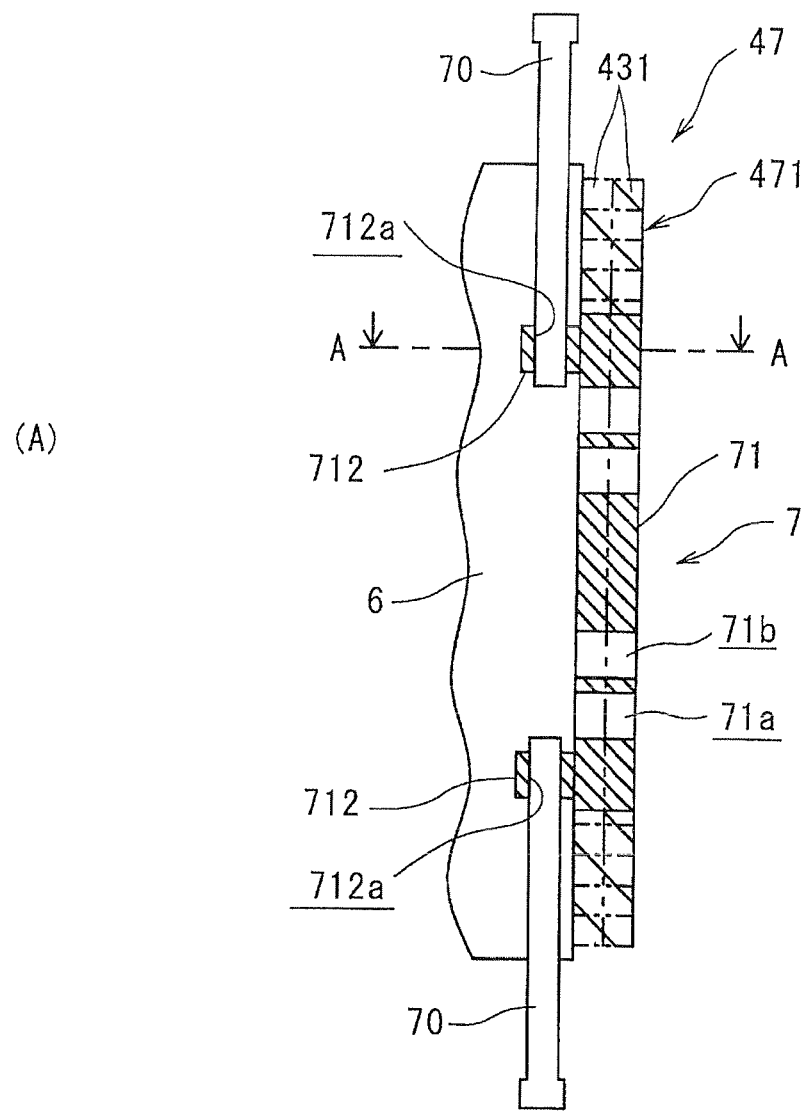
FIG. 10 are partial cross-sectional views showing the state of first aligning pieces, which are employed as aligning members in the stator coil manufacturing method according to the first embodiment, having been inserted in spaces of the wire assembly, wherein (B) is taken along the line A-A in (A).
Figure 10:
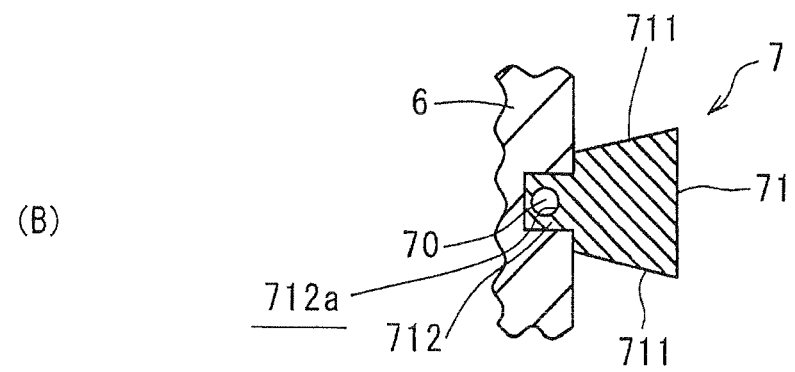
Figure 11:
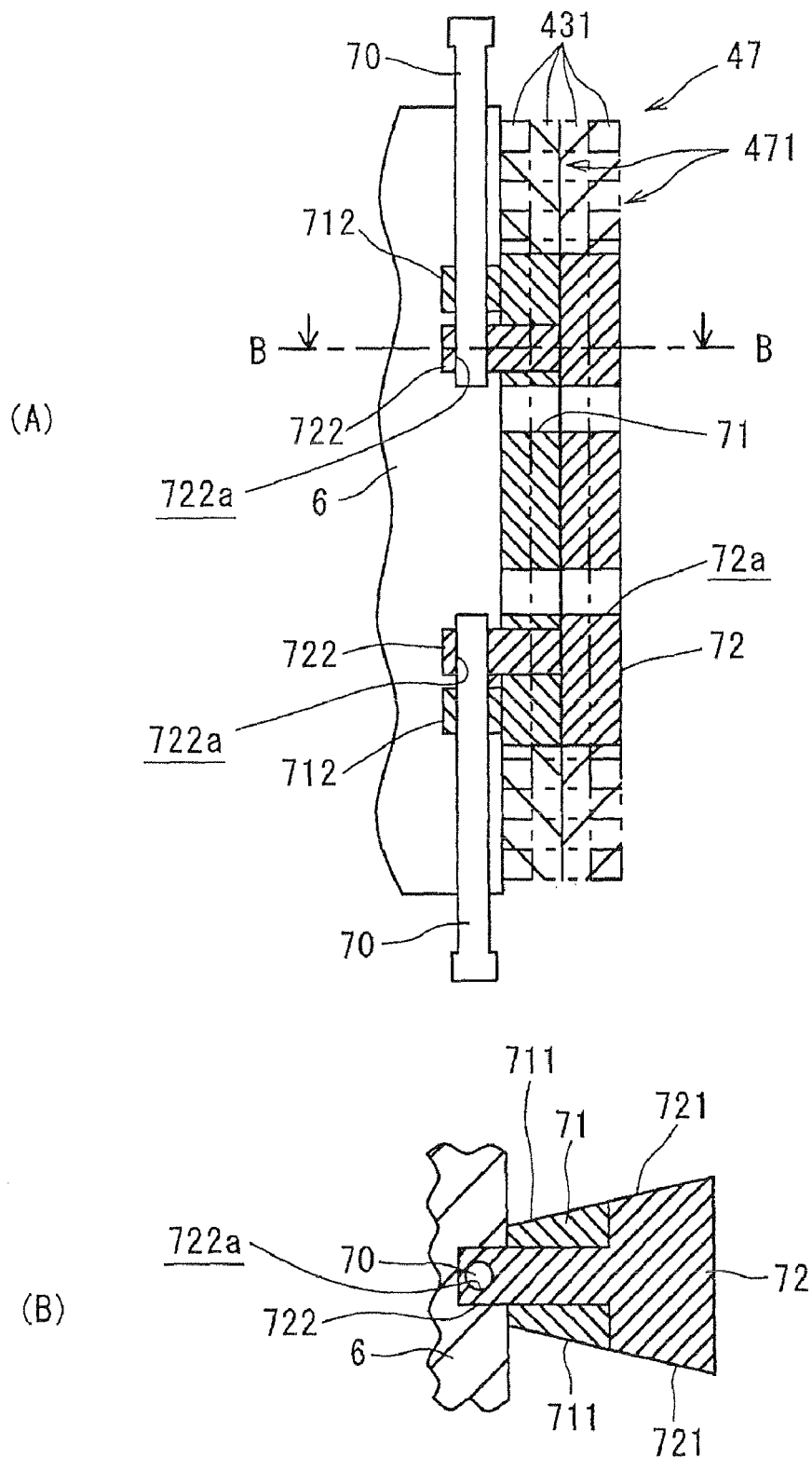
FIG. 11 are partial cross-sectional views showing the state of second aligning pieces, which are employed as aligning members in the stator coil manufacturing method according to the first embodiment, having been inserted in the spaces of the wire assembly, wherein (B) is taken along the line B-B in (A).
Figure 12:
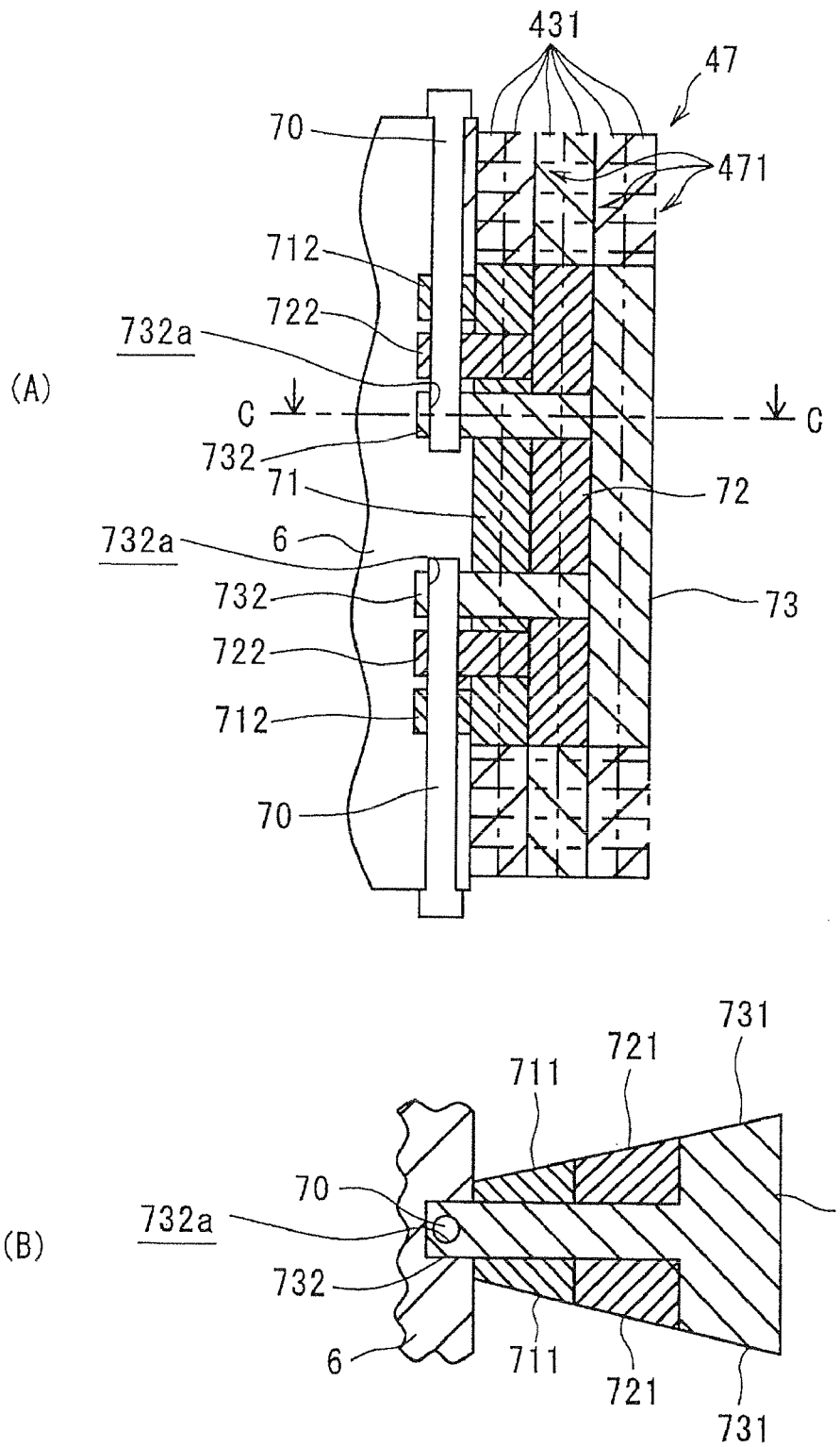
FIG. 12 are partial cross-sectional views showing the state of third aligning pieces, which are employed as aligning members in the stator coil manufacturing method according to the first embodiment, having been inserted in the spaces of the wire assembly, wherein (B) is taken along the line C-C in (A).

Each of the first aligning pieces 71 has, as shown in FIG. 10, a pair of first taper surfaces 711 to respectively abut a facing pair of the side surfaces of the straight superposed parts 471 of the wire assembly 47. Each of the first aligning pieces 71 also has a pair of protrusions 712 for fixation; each of the protrusions 712 has a fixing pin insertion hole 712a formed through an end portion thereof. Similarly, each of the second aligning pieces 72 has, as shown in FIG. 11, a pair of second taper surfaces 721 to respectively abut a facing pair of the side surfaces of the straight superposed parts 471 of the wire assembly 47. Each of the second aligning pieces 72 also has a pair of protrusions 722 for fixation; each of the protrusions 722 has a fixing pin insertion hole 722a formed through an end portion thereof. Similarly, each of the third aligning pieces 73 has, as shown in FIG. 12, a pair of third taper surfaces 731 to respectively abut a facing pair of the side surfaces of the straight superposed parts 471 of the wire assembly 47. Each of the third aligning pieces 73 also has a pair of protrusions 732 for fixation; each of the protrusions 732 has a fixing pin insertion hole 732a formed through an end portion thereof.

The thickness (i.e., the thickness in the stacking direction) of each of the first to third aligning pieces 71-73 is equal to the thickness (i.e., the thickness in the superposing direction) of the straight superposed parts 471 of the wire assembly 47. When the second aligning pieces 72 are respectively stacked on the first aligning pieces 71 with the third aligning pieces 73 respectively stacked on the second aligning pieces 72, each corresponding triad of the first taper surfaces 711 of the first aligning pieces 71, the second taper surfaces 721 of the second aligning pieces 72, and the third taper surfaces 731 of the third aligning pieces 73 falls on the same plane (see FIG. 12(B)).

Each of the first aligning pieces 71 further has a pair of protrusion insertion holes 71a into which the protrusions 722 of the corresponding second aligning piece 72 can be respectively inserted, and a pair of protrusion insertion holes 71b into which the protrusions 732 of the corresponding third aligning piece 73 can be respectively inserted (see FIG. 10(A)). Moreover, each of the second aligning pieces 72 further has a pair of protrusion insertion holes 72a into which the protrusions 732 of the corresponding third aligning piece 73 can be respectively inserted (see FIG. 11(A)).

The core member 6 has a plurality of recesses in which the protrusions 712 of the first aligning pieces 71, the protrusions 722 of the second aligning pieces 72, and the protrusions 732 of the third aligning pieces 73 can be inserted. Moreover, fixing pins 70, each to be inserted through the corresponding insertion holes 712a, 722a, and 732a of the protrusions 712, 722, and 732, are held in the core member 6 so as to be capable of advancing and retreating in three stages.

The insertion of the first to third aligning pieces 71-73 into the spaces 472 and the advancing and retreating of the fixing pins 70 may be carried out either manually or automatically.

In the first turn of the rolling of the wire assembly 47, with the fixing pins 70 retreated from the recesses of the core member 6, the first aligning pieces 71 are respectively inserted into the spaces 472 of the wire assembly 47, and the protrusions 712 of the first aligning pieces 71 are further respectively inserted into the corresponding recesses of the core member 6. Then, the fixing pins 70 are advanced inside of the corresponding recesses of the core member 6 by one stage, thereby being respectively inserted into the fixing pin insertion holes 712a formed in the protrusions 712 of the first aligning pieces 71. Consequently, the first aligning pieces 71 are held by the core member 6 in a state of being respectively inserted in the spaces 472 of the wire assembly 47 (see FIG. 9(A) and FIG. 10). Moreover, in this state, the taper surfaces 711 of the first aligning pieces 71 abut the straight superposed parts 471 of the wire assembly 47 in the first layer. As a result, the straight superposed parts 471 in the first layer are positioned by the first aligning pieces 71. Accordingly, in the first layer of the wire assembly 47 which is rolled around the core member 6 by the first turn of the rolling, it is possible to secure the superposition of the straight portions 431 in each of the straight superposed parts 471 and thereby radially align the straight portions 431; it is also possible to make the intervals between adjacent ones of the straight superposed parts 471 even.

In the second turn of the rolling of the wire assembly 47, the second aligning pieces 72 are respectively inserted into the spaces 472 of the wire assembly 47, and the protrusions 722 of the second aligning pieces 72 are further respectively inserted, through the protrusion insertion holes 71a of the first aligning pieces 71, into the corresponding recesses of the core member 6. Then, the fixing pins 70 are further advanced inside of the corresponding recesses of the core member 6 by one stage, thereby being respectively inserted into the fixing pin insertion holes 722a formed in the protrusions 722 of the second aligning pieces 72. Consequently, the second aligning pieces 72 are held by the core member 6 in a state of being respectively inserted in the spaces 472 of the wire assembly 47 and stacked on the first aligning pieces 71 (see FIG. 9(B) and FIG. 11). Moreover, in this state, the taper surfaces 721 of the second aligning pieces 72 abut the straight superposed parts 471 of the wire assembly 47 in the second layer. As a result, the straight superposed parts 471 in the second layer are positioned by the second aligning pieces 72. Accordingly, in the second layer of the wire assembly 47 which is rolled around the core member 6 by the second turn of the rolling, it is possible to secure the superposition of the straight portions 431 in each of the straight superposed parts 471 and thereby radially align the straight portions 431; it is also possible to make the intervals between adjacent ones of the straight superposed parts 471 even. Moreover, it is also possible to radially align the straight portions 431 in the straight superposed parts 471 in the second layer with those in the corresponding straight superposed parts 471 in the first layer.

In the third turn of the rolling of the wire assembly 47, the third aligning pieces 73 are respectively inserted into the spaces 472 of the wire assembly 47, and the protrusions 732 of the third aligning pieces 73 are further respectively inserted, through the protrusion insertion holes 72a of the second aligning pieces 72 and the protrusion insertion holes 71b of the first aligning pieces 71, into the corresponding recesses of the core member 6. Then, the fixing pins 70 are further advanced inside of the corresponding recesses of the core member 6 by one stage, thereby being respectively inserted into the fixing pin insertion holes 732a formed in the protrusions 732 of the third aligning pieces 73. Consequently, the third aligning pieces 73 are held by the core member 6 in a state of being respectively inserted in the spaces 472 of the wire assembly 47 and stacked on the second aligning pieces 72 (see FIG. 9(C) and FIG. 12). Moreover, in this state, the taper surfaces 731 of the third aligning pieces 73 abut the straight superposed parts 471 of the wire assembly 47 in the third layer. As a result, the straight superposed parts 471 in the third layer are positioned by the third aligning pieces 73. Accordingly, in the third layer of the wire assembly 47 which is rolled around the core member 6 by the third turn of the rolling, it is possible to secure the superposition of the straight portions 431 in each of the straight superposed parts 471 and thereby radially align the straight portions 431; it is also possible to make the intervals between adjacent ones of the straight superposed parts 471 even. Moreover, it is also possible to radially align the straight portions 431 in the straight superposed parts 471 in the third layer with those in the corresponding straight superposed parts 471 in the first and second layers.

In addition, if the wire assembly 47 is rolled by four turns, in the fourth turn of the rolling, fourth aligning pieces may be further respectively inserted into the spaces 472 of the wire assembly 47, and be held by the core member 6 in a state of being respectively stacked on the third aligning pieces 73.

To remove the rolled wire assembly 48 from the core member 6, the fixing pins 70 are first retreated and thereby removed out of the fixing pin insertion holes 712a, 722a, and 732a of the first to third aligning pieces 71-73. Then, the rolled wire assembly 48 is removed, together with the first to third aligning pieces 71-73, from the core member 6. Thereafter, the first to third aligning pieces 71-73 are further removed from the rolled wire assembly 48.

Accordingly, with the stator coil manufacturing method of the first embodiment, it is possible to reliably align all the straight portions 431 in each of the straight stacked parts 481 of the rolled wire assembly 48 in a radial direction of the rolled wire assembly 48 while making the intervals between adjacent ones of the straight stacked parts 481 even.

Consequently, it is possible to improve both the accuracy of alignment of the slot-accommodated portions 43 of the stator coil 4 in each of the slots 31 of the stator core 30 and the accuracy of the pitches between adjacent ones of the straight stacked parts 481 in the stator coil 4. As a result, it is possible to improve both the slot occupation ratio in the stator 3 and the output of the electric rotating machine 1.

Moreover, it is possible to easily dispose the core segments 32 with respect to the rolled wire assembly 48, thereby improving the productivity of the stator 3.

In addition, in the stator coil manufacturing method of the first embodiment, it is possible to employ a continuous rolling process instead of the pitch-based rolling process.

Second Embodiment

Figure 13:
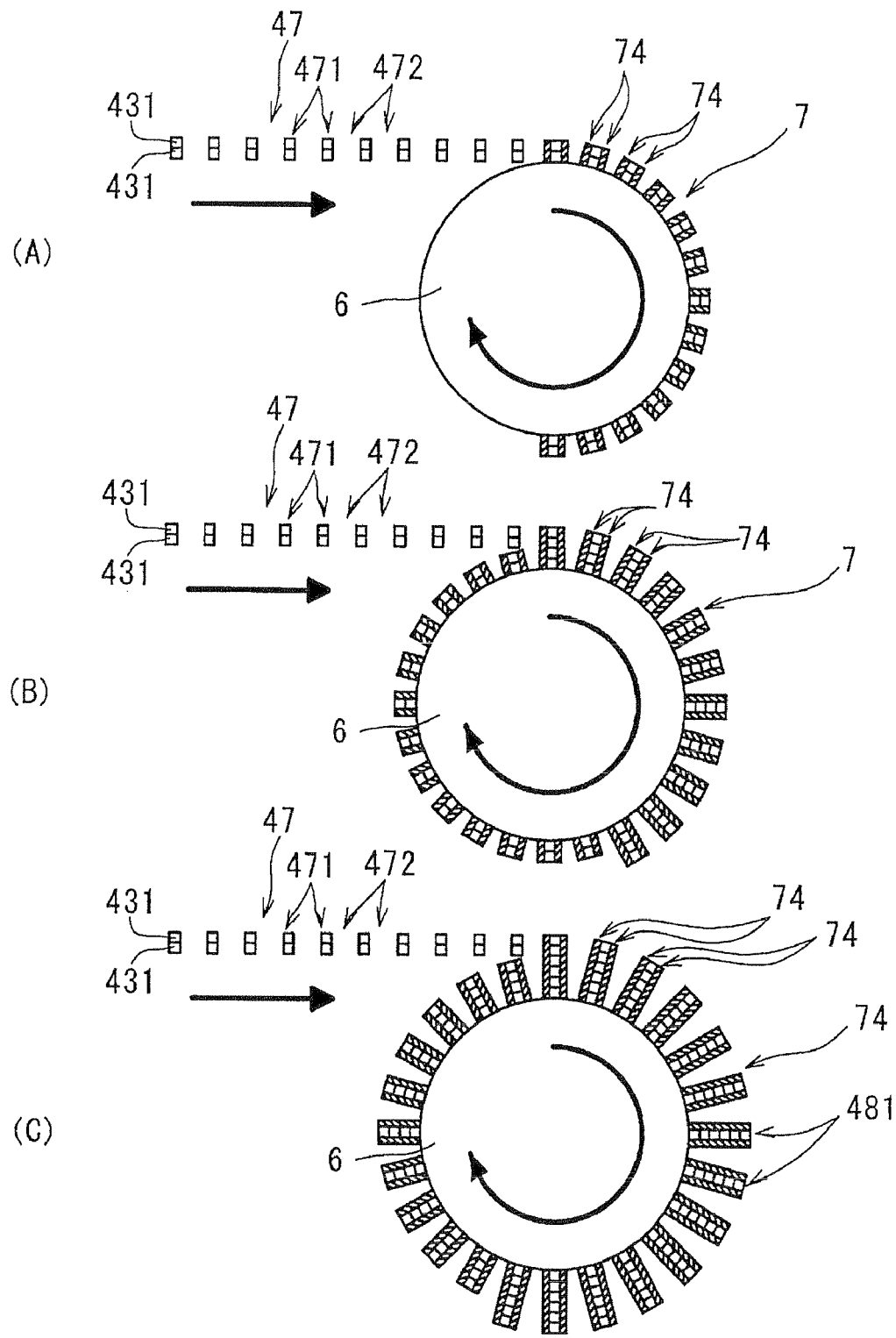
FIG. 13 are schematic diagrams illustrating a stator coil manufacturing method according to the second embodiment.
Figure 14:
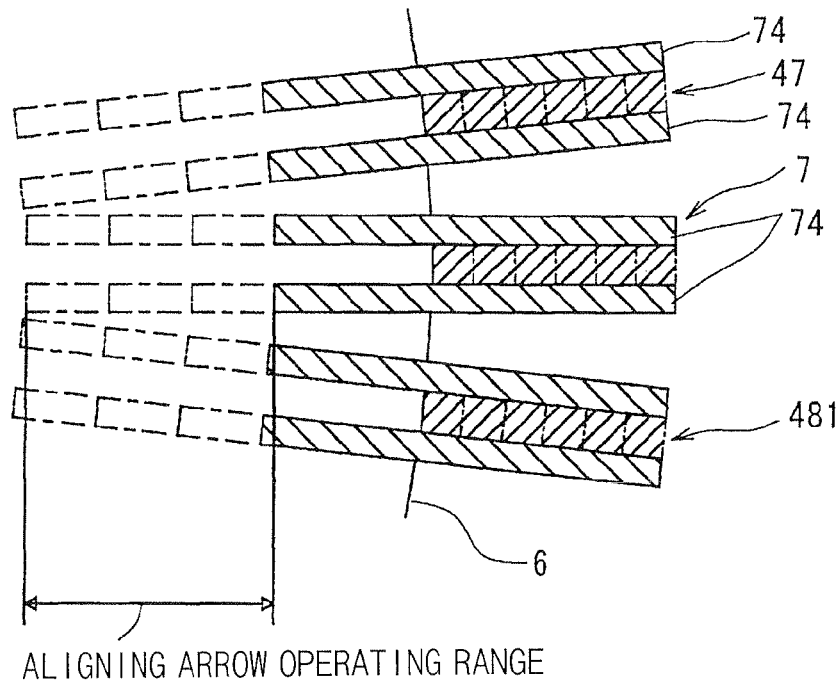
FIG. 14 is a partial cross-sectional view showing the state of aligning arrows, which are employed as aligning members in the stator coil manufacturing method according to the second embodiment, having been protruded from a core member.
Figure 15:
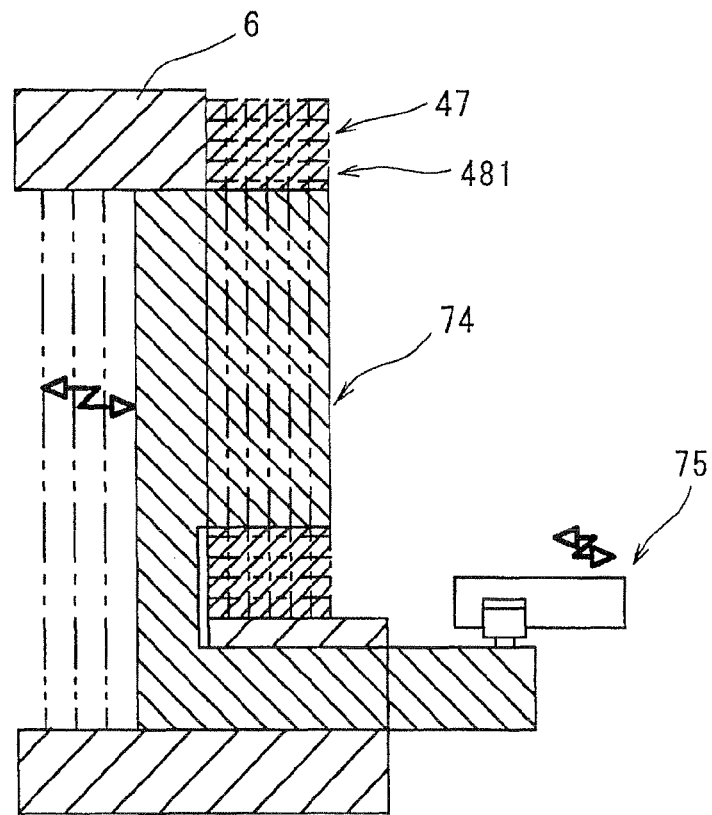
FIG. 15 is a schematic partial cross-sectional diagram illustrating the configuration of protruding the aligning arrows in the stator coil manufacturing method according to the second embodiment.

The rolling process in the stator coil manufacturing method of the second embodiment, which is illustrated in FIGS. 13-15, is a continuous rolling process. In this continuous rolling process, the wire assembly 47 is rolled while being continuously fed to the core member 6. Moreover, the rolling of the wire assembly 47 around the core member 6 is performed with aligning members 7 being sequentially inserted into the spaces 472 formed between adjacent ones of the straight superposed parts 471 of the wire assembly 47. More specifically, each of the aligning members 7 is inserted, when the feeding of the wire assembly 47 and the rotation of the core member 6 are made in synch with each other, into the space 472 between those two of the straight superposed parts 471 which have just started to be rolled around the core member 6.

In the rolling process of the second embodiment, the aligning members 7 are protruded from the outer circumferential surface of the core member 6 radially outward by a predetermined amount for each turn of the rolling of the wire assembly 47, thereby being respectively inserted into the spaces 472 in stages.

In the stator coil manufacturing method of the second embodiment, as the aligning members 7, pairs of aligning arrows 74 are employed which protrude from the outer circumferential surface of the core member 6 radially outward to restrain both the side surfaces of each of the straight superposed parts 471 which are respectively on the forward and backward sides in the rolling direction. That is, each pair of the aligning arrows 74 can sandwich corresponding ones of the straight superposed parts 471 of the wire assembly 47 in the circumferential direction of the core member 6. The number of pairs of the aligning arrows 74 provided in the core member 6 is set to be equal to the number of the straight stacked parts 481 formed in the rolled wire assembly 48. Each pair of the aligning arrows 74 is protruded from the outer circumferential surface of the core member 6 radially outward so as to respectively abut the side surfaces of each of the corresponding straight superposed parts 471.

Each pair of the aligning arrows 74 is protruded from the outer circumferential surface of the core member 6 in stages. The predetermined amount, by which each pair of the aligning arrows 74 is protruded in one stage (or for one turn of the rolling of the wire assembly 47), is set to be equal to the thickness (i.e., the thickness in the superposing direction) of the straight superposed parts 471 of the wire assembly 47. The number of the protruding stages for each pair of the aligning arrows 74 is set to be equal to the predetermined number of turns by which the wire assembly 47 is rolled around the core member 6.

The protruding of each pair of the aligning arrows 74 is carried out by an aligning arrow driving device 75. For each pair of the aligning arrows 74, there is provided one aligning arrow driving device 75. It is possible to control, by the control device, all of the aligning arrow driving devices 75, the driving device for the rotation of the core member 6, and the driving device for the feeding of the wire assembly 47 so that each pair of the aligning arrows 74 can be protruded by the predetermined amount at a predetermined timing in accord with the synchronized operations of feeding the wire assembly 47 and rotating the core member 6.

In the first turn of the rolling of the wire assembly 47, each pair of the aligning arrows 74 is protruded from the outer circumferential surface of the core member 6 radially outward by one stage. Consequently, each of the straight superposed parts 471 of the wire assembly 47 in the first layer is sandwiched and thereby positioned by one of the pairs of the aligning arrows 74 (see FIG. 13(A)). As a result, in the first layer of the wire assembly 47 which is rolled around the core member 6 by the first turn of the rolling, it is possible to secure the superposition of the straight portions 431 in each of the straight superposed parts 471 and thereby radially align the straight portions 431; it is also possible to make the intervals between adjacent ones of the straight superposed parts 471 even.

In the second turn of the rolling of the wire assembly 47, each pair of the aligning arrows 74 is further protruded from the outer circumferential surface of the core member 6 radially outward by one stage. Consequently, each pair of the straight superposed parts 47 in the first and second layers is sandwiched and thereby positioned by one of the pairs of the aligning arrows 74 (see FIG. 13(B)). As a result, in the first and second layers of the wire assembly 47 which are rolled around the core member 6 respectively by the first and second turns of the rolling, it is possible to secure the superposition of the straight portions 431 in each of the straight superposed parts 471 and thereby radially align the straight portions 431; it is also possible to make the intervals between adjacent ones of the straight superposed parts 471 even.

In the third turn of the rolling of the wire assembly 47, each pair of the aligning arrows 74 is further protruded from the outer circumferential surface of the core member 6 radially outward by one stage. Consequently, each triad of the straight superposed parts 471 in the first to third layers is sandwiched and thereby positioned by one of the pairs of the aligning arrows 74 (see FIG. 13(C)). As a result, in the first to third layers of the wire assembly 47 which are rolled around the core member 6 respectively by the first to third turns of the rolling, it is possible to secure the superposition of the straight portions 431 in each of the straight superposed parts 471 and thereby radially align the straight portions 431; it is also possible to make the intervals between adjacent ones of the straight superposed parts 471 even.

To remove the rolled wire assembly 48 from the core member 6, all of the aligning arrows 74 are retreated into the core member 6. As a result, the rolled wire assembly 48 can be easily removed from the core member 6.

Accordingly, with the stator coil manufacturing method of the second embodiment, it is also possible to reliably align all the straight portions 431 in each of the straight stacked parts 481 of the rolled wire assembly 48 in a radial direction of the rolled wire assembly 48 while making the intervals between adjacent ones of the straight stacked parts 481 even.

Other constitutions, operations, and effects are the same as those in the first embodiment.

In addition, in the stator coil manufacturing method of the second embodiment, it is possible to employ a pitch-based rolling process instead of the continuous rolling process.

Third Embodiment

Figure 16:
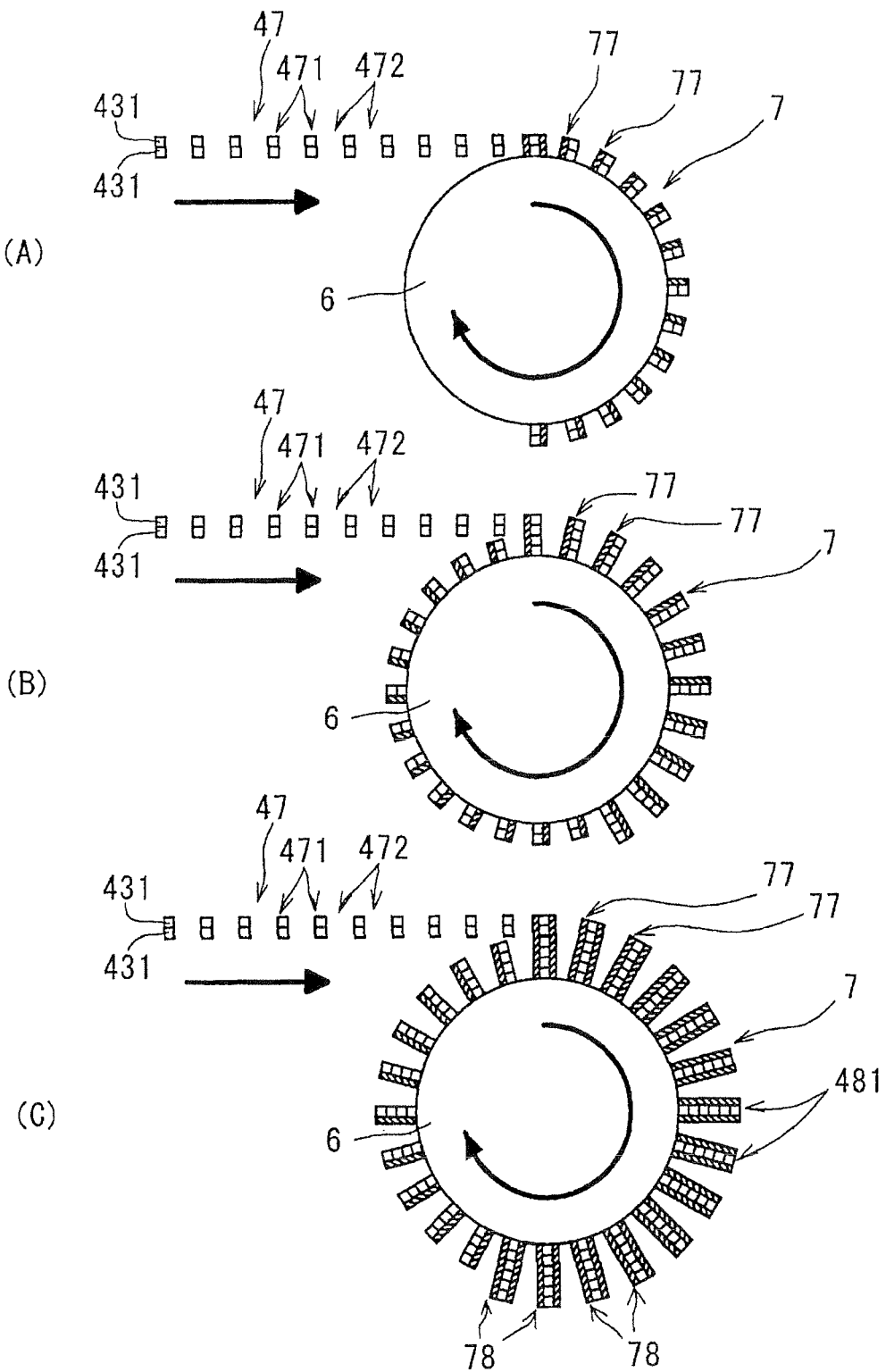
FIG. 16 are schematic diagrams illustrating a stator coil manufacturing method according to the third embodiment.

In the stator coil manufacturing method of the third embodiment illustrated in FIG. 16, as the aligning members 7, pairs of aligning arrows 77 and post-aligning jigs 78 are employed instead of the pairs of the aligning arrows 74 in the stator coil manufacturing method of the second embodiment.

Specifically, in the stator coil manufacturing method of the third embodiment, as the aligning members 7, the aligning arrows 77 are employed which protrude from the outer circumferential surface of the core member 6 radially outward to restrain that side surface of each of the straight superposed parts 471 which is on the backward side in the rolling direction.

More specifically, when the wire assembly 47 is rolled around the core member 6 (i.e., during the rolling of the wire assembly 47 around the core member 6), the aligning arrows 77 are protruded from the outer circumferential surface of the core member 6 radially outward to restrain that side surface of each of the straight superposed parts 471 which is on the backward side in the rolling direction. During the rolling of the wire assembly 47, tension is applied, for example by the driving device for the feeding of the wire assembly 47, to the backward side of each of the straight superposed parts 471 in the rolling direction. Therefore, by restraining the side surface of each of the straight superposed parts 471 on the backward side with one of the aligning arrows 77 during the rolling of the wire assembly 47, it is possible to secure the superposition of the straight portions 431 in each of the straight superposed parts 471 and thereby radially align the straight portions 431; it is also possible to make the intervals between adjacent ones of the straight superposed parts 471 even.

The number of the aligning arrows 77 provided in the core member 6 is set to be equal to the number of the straight stacked parts 481 formed in the rolled wire assembly 48. Each of the aligning arrows 77 is protruded from the outer circumferential surface of the core member 6 radially outward so as to abut the side surfaces of corresponding ones of the straight superposed parts 471 on the backward side in the rolling direction.

Each of the aligning arrows 77 is protruded from the outer circumferential surface of the core member 6 in stages. The predetermined amount, by which each of the aligning arrows 77 is protruded in one stage, is set to be equal to the thickness (i.e., the thickness in the superposing direction) of the straight superposed parts 471 of the wire assembly 47. The number of the protruding stages for each of the aligning arrows 77 is set to be equal to the predetermined number of turns by which the wire assembly 47 is rolled around the core member 6.

The protruding of each of the aligning arrows 77 is carried out by an aligning arrow driving device 75. For each of the aligning arrows 77, there is provided one aligning arrow driving device 75. It is possible to control, by the control device, all of the aligning arrow driving devices 75, the driving device for the rotation of the core member 6, and the driving device for the feeding of the wire assembly 47 so that each of the aligning arrows 77 can be protruded by the predetermined amount at a predetermined timing in accord with the synchronized operations of feeding the wire assembly 47 and rotating the core member 6.

In the first turn of the rolling of the wire assembly 47, each of the aligning arrows 77 is protruded from the outer circumferential surface of the core member 6 radially outward by one stage. Consequently, each of the straight superposed parts 471 of the wire assembly 47 in the first layer is hitched on and thereby almost positioned by one of the aligning arrows 77 (see FIG. 16(A)).

In the second turn of the rolling of the wire assembly 47, each of the aligning arrows 77 is further protruded from the outer circumferential surface of the core member 6 radially outward by one stage. Consequently, each pair of the straight superposed parts 471 in the first and second layers is hitched on and thereby positioned by one of the aligning arrows 77 (see FIG. 16(B)).

Thereafter, in the same manner as described above, the wire assembly 47 is further rolled while restraining one side surface of each of the straight superposed parts 471 with the aligning arrows 77.

After the rolling of the wire assembly 47 around the core member 6 is finished, the post-aligning jigs 78 are respectively inserted, from the radially outer side of the rolled wire assembly 48, into the spaces between the straight stacked parts 481 to abut those side surfaces of the straight stacked parts 481 which are on the forward side in the rolling direction. As a result, with the pairs of the aligning arrows 77 and post-aligning jigs 78, it is possible to sandwich each of the straight stacked parts 481 and thereby reliably align the straight portions 431 in each of the straight stacked parts 481.

In addition, the post-aligning jigs 78 may also be inserted from the radially inner side of the rolled wire assembly 48, i.e. from the outer circumferential surface of the core member 6, into the spaces between the straight stacked parts 481.

Accordingly, with the stator coil manufacturing method of the third embodiment, it is also possible to reliably align all the straight portions 431 in each of the straight stacked parts 481 of the rolled wire assembly 48 in a radial direction of the rolled wire assembly 48 while making the intervals between adjacent ones of the straight stacked parts 481 even.

Other constitutions, operations, and effects are the same as those in the first and second embodiments.

In addition, in the stator coil manufacturing method of the third embodiment, it is possible to employ a pitch-based rolling process instead of the continuous rolling process.

Fourth Embodiment

Figure 17:
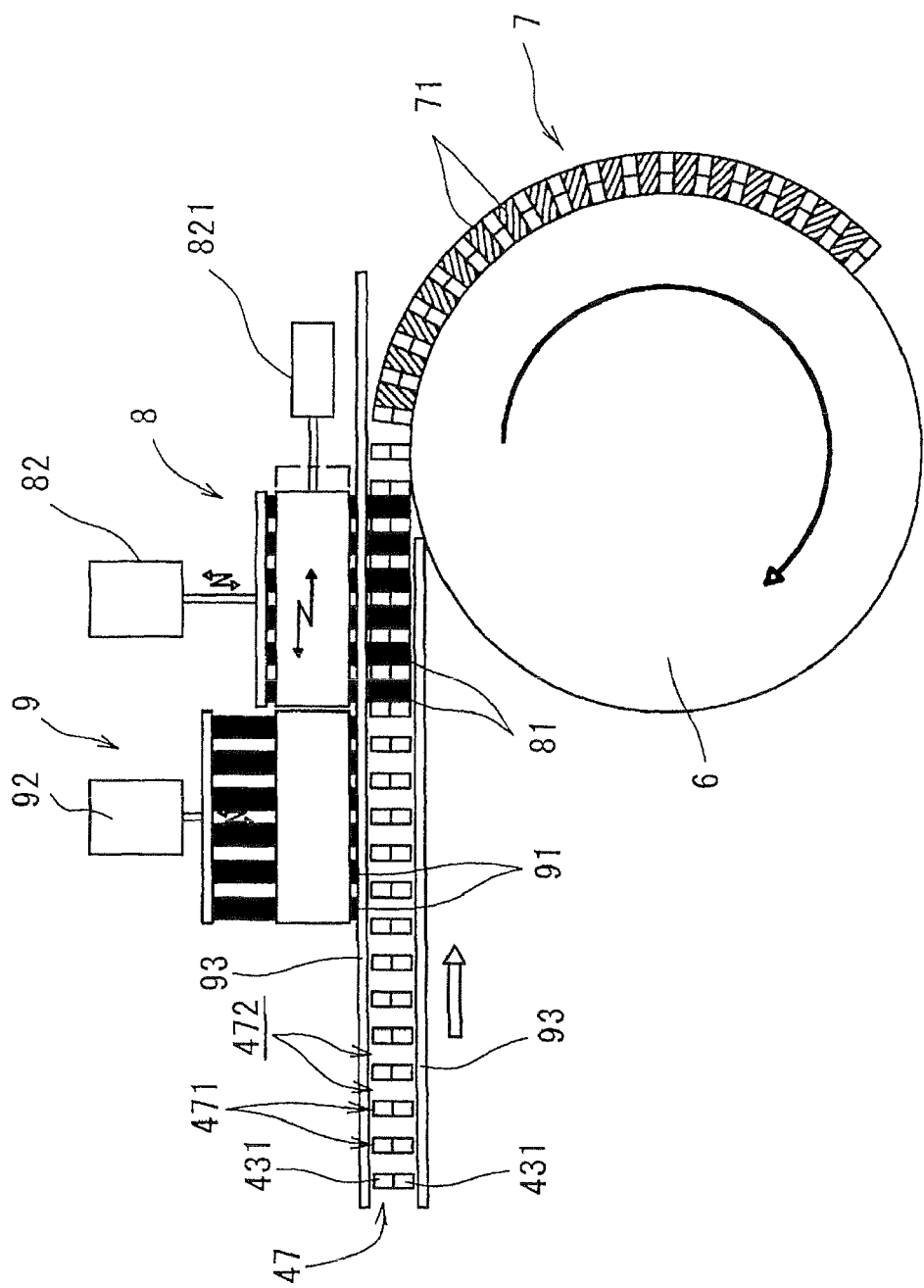
FIG. 17 is a schematic diagram illustrating a stator coil manufacturing method according to the fourth embodiment.
Figure 18:
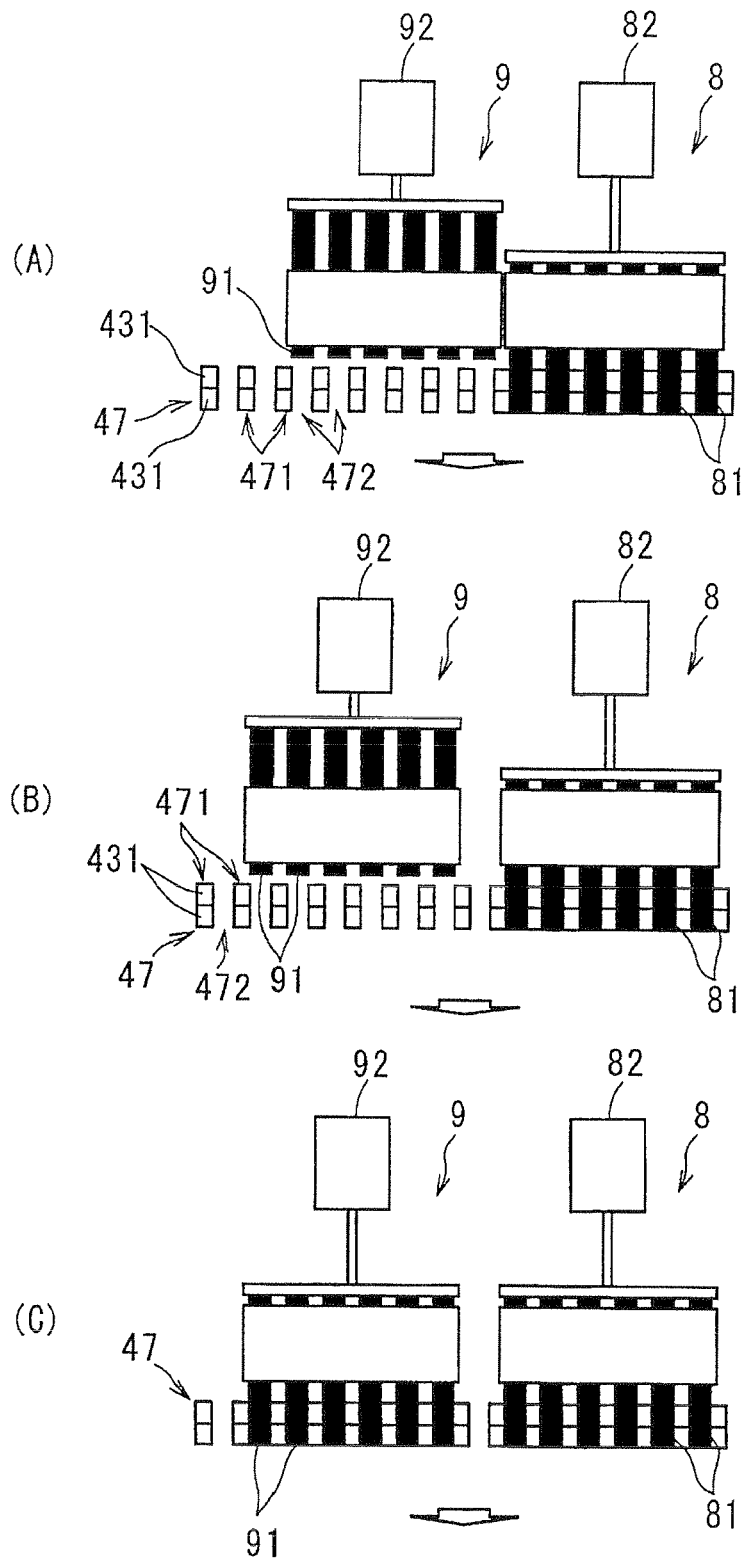
FIG. 18 are schematic diagrams illustrating the operations of pre-aligning members and position keeping members in the stator coil manufacturing method according to the fourth embodiment.
Figure 19:
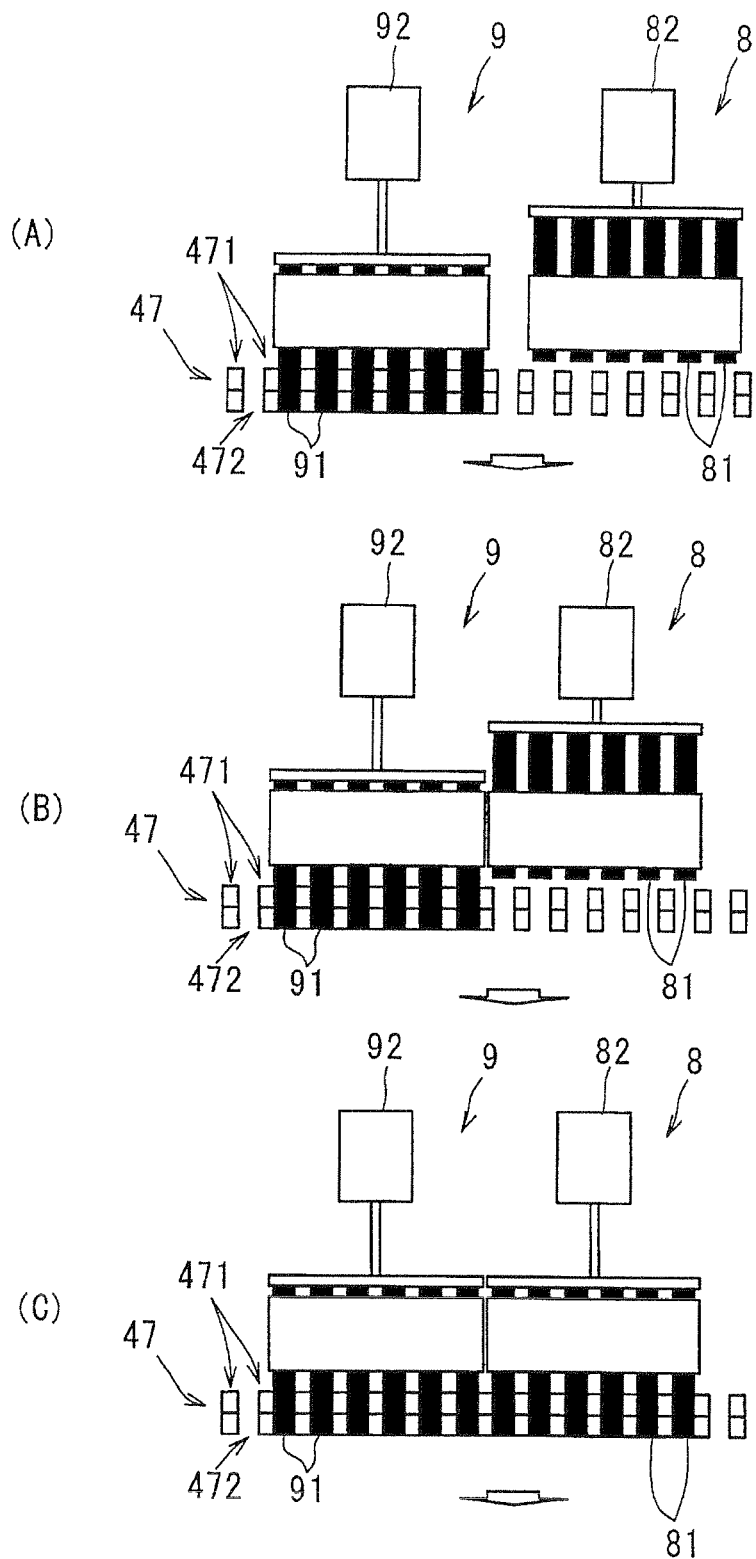
FIG. 19 are schematic diagrams the operations of the pre-aligning members and position keeping members in the stator coil manufacturing method according to the fourth embodiment.

The stator coil manufacturing method of the fourth embodiment, which is illustrated in FIGS. 17-19, is such a modification of the stator coil manufacturing method of the first embodiment that: when the wire assembly 47 is on its way to be fed to the core member 6, the superposition of the straight portions 431 in each of the straight superposed parts 471 of the wire assembly 47 is preliminarily secured and the sizes of the spaces 472 between adjacent ones of the straight superposed parts 471 are preliminarily made even.

A pre-aligning apparatus 8 includes a plurality of (e.g., six in the present embodiment) pre-aligning members 81, a pre-aligning member driving device 82, and a horizontal driving device 821. The pre-aligning member driving device 82 advances and retreats all of the pre-aligning members 81 at the same time. In addition, it is also possible to employ a plurality of pre-aligning member driving devices, one for each pre-aligning member 81, to separately advance and retreat the pr-aligning members 81. The advancing and retreating direction of the pre-aligning members 81 is parallel to the superposing direction of the straight portions 431 in each of the straight superposed parts 471 of the wire assembly 47 which is on the way to be fed to the core member 6. Therefore, the pre-aligning members 81 are inserted into the spaces 472 upon being advanced and removed out of the spaces 472 upon being retreated.

All of the pre-aligning members 81 and the pre-aligning member driving device 82 are configured to be advanced and retreated by the horizontal driving device 821 in a direction parallel to the feeding direction of the wire assembly 47. In this case, the amount of advance (or the amount of retreat) is equal to the interval between an adjacent pair of the straight superposed parts 471 in the wire assembly 47, namely, one pitch. In addition, the amount of advance (or the amount of retreat) may be set to be equal to the amount by which each time the wire assembly 47 is fed in the pitch-based rolling process. That is, when the rolling process is a N pitch-based rolling process, where N is a natural number, the amount of advance (or the amount of retreat) may be set to be N times the interval between an adjacent pair of the straight superposed parts 471 in the wire assembly 47. Furthermore, the advancing (i.e., the moving in the feeding direction of the wire assembly 47) of the pre-aligning members 81 and pre-aligning member driving device 82 is carried out in synch with and at the same speed as the feeding of the wire assembly 47.

A position keeping apparatus 9 includes a plurality of (e.g., six in the present embodiment) position keeping members 91 and a position keeping member driving device 92. The position keeping member driving device 92 advances and retreats all of the position keeping members 91 at the same time. In addition, it is also possible to employ a plurality of position keeping member driving devices, one for each position keeping member 91, to separately advance and retreat the position keeping members 91. The advancing and retreating direction of the position keeping members 91 is parallel to the superposing direction of the straight portions 431 in each of the straight superposed parts 471 of the wire assembly 47 which is on the way to be fed to the core member 6. Therefore, the position keeping members 91 are inserted into the spaces 472 upon being advanced and removed out of the spaces 472 upon being retreated.

A pair of upper and lower aligning plates 93 uniforms (or makes even), at the turn portions 44, the thickness (i.e., the thickness in the superposing direction of the straight portions 431) of the wire assembly 47 which is on the way to be fed to the core member 6.

The pre-aligning members 81 have substantially the same width (i.e., the width in the feeding direction of the wire assembly 47) as the spaces 472 formed between adjacent ones of the straight superposed parts 471 of the wire assembly 47. Therefore, by inserting the pre-aligning members 81 into the spaces 472 to sandwich the straight superposed parts 471 of the wire assembly 47 between the pre-aligning members 81, it is possible secure the superposition of the straight portions 431 in each of the straight superposed parts 471 and thereby align the straight portions 431 in the superposing direction.

To align the straight portions 431 in each of the straight superposed parts 471 in the superposing direction as described above, it is necessary to employ at least two pre-aligning members 81. Moreover, employing three or more pre-aligning members 81, it is further possible to regulate the interval between those two of the straight superposed parts 47 which are interposed between outermost two of the pre-aligning members 81. Therefore, it is preferable to employ at least three pre-aligning members 81. Furthermore, in terms of further improving both the accuracy of alignment of the straight portions 431 in each of the straight superposed parts 471 and the accuracy of the pitches between the straight superposed parts 471, it is further preferable to employ at least n/2 pre-aligning members 81, where n is the number of the straight superposed parts 471 in the wire assembly 47.

The position keeping members 91 have a width slightly smaller than that of the pre-aligning members 81. In other words, the position keeping members 91 have a width slightly smaller than that of the spaces 472 of the wire assembly 47. Therefore, when the position keeping members 91 are inserted into the spaces 472 of the wire assembly 47 having been conveyed thereto prior to the pre-aligning members 81, the insertion of the position keeping members 91 into the spaces 472 can be smoothly made. Furthermore, for the purpose of further facilitating the insertion of the pre-aligning members 81 into the spaces 472 and the insertion of the position keeping members 91 into the spaces 472, each of the pre-aligning members 81 and position keeping members 91 has an end portion that is so shaped as to decrease in width toward the end thereof. However, it should be noted that for the sake of simplicity, the end portions of the pre-aligning members 81 and position keeping members 91 are depicted to have a substantially rectangular shape in FIGS. 17-19.

Each of the pre-aligning members 81 and position keeping members 91 is formed of a rectangular body that has a rectangular cross section conforming to the shape of the spaces 472 of the wire assembly 47. In addition, it is also possible to employ, instead of one pre-aligning member 81 (or position keeping member 91) formed of the rectangular body, a plurality of pre-aligning members (or position keeping members) having, for example, a cylindrical shape.

The rolling of the wire assembly 47 is carried out, by controlling all of the pre-aligning member driving device 82, the position keeping member driving device 92, the horizontal driving device 821, the driving device for the rotation of the core member 6, and the driving device for the feeding of the wire assembly 47 with the control device, as follows.

<Process of Inserting Position Keeping Members>

The wire assembly 47 is conveyed until (or until just before) the rolling start end of the wire assembly 47 makes contact with the core member 6. After the conveying of the wire assembly 47 is stopped, the position keeping members 19 are inserted into the spaces 472 of the wire assembly 47 (see FIG. 19(B)). Consequently, the wire assembly 47 is kept at a predetermined position.

<Process of Inserting Pre-Aligning Members>

The pre-aligning members 81 are inserted into the spaces 472 of the wire assembly 47 which is kept at the predetermined position by the position keeping members 91 (see FIG. 19(C)). Consequently, on the rolling start end side of the wire assembly 47, it is possible to radially align the straight portions 431 in the straight superposed parts 471 and make the intervals between the straight superposed parts 471 even.

<Process of Removing Position Keeping Members>

The position keeping members 91 are removed out of the spaces 472 of the wire assembly 47 (see FIG. 18(A)).

<Process of Advancing>

With the pre-aligning members 81 remaining inserted in the spaces 472, the wire assembly 47 is advanced to the core member 6 by one pitch (see FIG. 18(B)). Consequently, the rolling start end of the wire assembly 47 is rolled around the core member 6 by one pitch.

After the one-pitch advancing of the wire assembly 47, one of the first aligning pieces 71 is inserted into the space 472 on the rolling start end side of the wire assembly 47 which has just started to be rolled around the core member 6. Since the straight portions 431 have been pre-aligned in the superposing direction and the pitches between the straight superposed parts 471 have been preliminarily made even by the pre-aligning members 81, the insertion of the first aligning piece 71 into the space 472 can be made smoothly.

<Process of Inserting Position Keeping Members>

With the pre-aligning members 81 remaining inserted in the spaces 472, the position keeping members 91 are inserted into other spaces 472 of the wire assembly 47 (i.e., spaces 472 which are positioned one-pitch apart from the spaces 472 having the pre-aligning members 81 inserted therein against the feeding direction of the wire assembly 47) (see FIG. 18(C)).

<Process of Removing Pre-Aligning Members>

The pre-aligning members 81 are removed out of the spaces 472 with the position keeping members 91 remaining inserted in the other spaces 472 (see FIG. 19(A)).

<Process of Retreating>

The pre-aligning members 81 are retreated by one pitch against the feeding direction of the wire assembly 47 (see FIG. 19(B)).

<Repeating Processes of Inserting Pre-Aligning Members to Retreating>

With the position keeping members 91 remaining inserted in the other spaces 472 of the wire assembly 47, the above-described processes of inserting the pre-aligning members 81, removing the position keeping members 91, advancing, inserting the position keeping members 91, removing the pre-aligning members 81, and retreating are repeated.

As above, with the pre-aligning members 81, it is possible to preliminarily align the straight portions 431 in each of the straight superposed parts 471 in the superposing direction and make the intervals between adjacent ones of the straight superposed parts 471 even. Consequently, in the rolled wire assembly 48 that is obtained by rolling the wire assembly 47, it is possible to improve both the accuracy of radial alignment of the straight portions 431 in each of the straight stacked parts 481 and the accuracy of the pitches between the straight stacked parts 481.

Moreover, when the pre-aligning members 81 are removed out of the spaces 472 of the wire assembly 47, there are always the position keeping members 91 remaining inserted in the other spaces 472 to keep the position of the wire assembly 47. That is, the removal and insertion of the pre-aligning members 81 are made with respect to the wire assembly 47 which is positioned by the position keeping members 91. Therefore, the pre-aligning members 81 can be easily inserted into the next spaces 472.

Furthermore, by improving in advance both the accuracy of alignment of the straight portions 431 and the accuracy of the pitches between the straight superposed parts 471 of the wire assembly 47 with the pre-aligning members 81, it is possible to enhance the effects of improving with the aligning members 7 both the accuracy of alignment of the straight portions 431 and the accuracy of the pitches between the straight superposed parts 471.

In addition, in the stator coil manufacturing methods of the second and third embodiments, it is also possible to employ a pitch-based rolling process as well as the processes of inserting the position keeping members 91, inserting the pre-aligning members 81, removing the position keeping members 91, advancing, inserting the position keeping members 91, removing the pre-aligning members 81, and retreating according the fourth embodiment.

Fifth Embodiment

Figure 20:
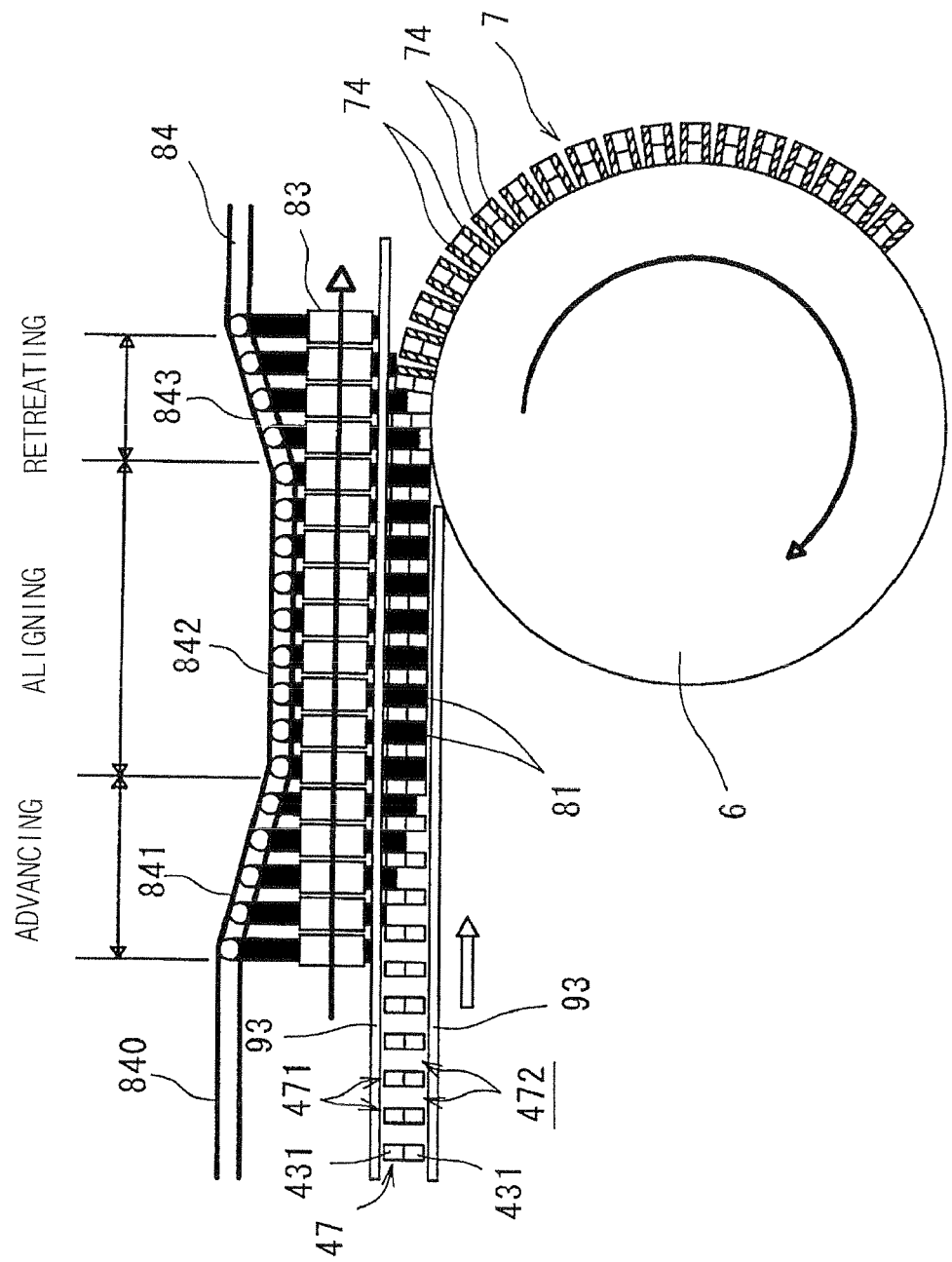
FIG. 20 is a schematic diagram illustrating a stator coil manufacturing method according to the fifth embodiment.
Figure 21:
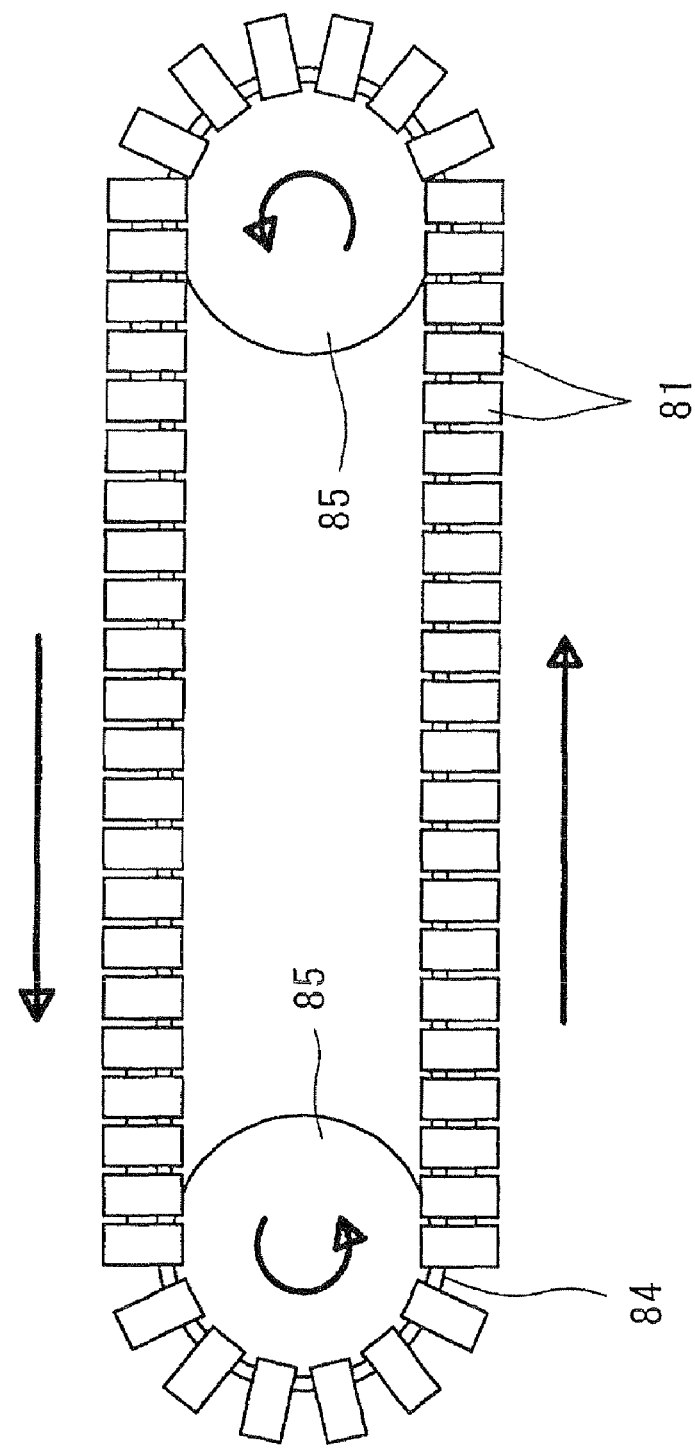
FIG. 21 is a schematic diagram illustrating the configuration of conveying the pre-aligning members using conveying rollers in a belt-conveyor manner in the stator coil manufacturing method according to the fifth embodiment.

The stator coil manufacturing method of the fifth embodiment, which is illustrated in FIGS. 20 and 21, is such a modification of the stator coil manufacturing method of the second embodiment that: when the wire assembly 47 is on the way to be fed to the core member 6, the superposition of the straight portions 431 in each of the straight superposed parts 471 of the wire assembly 47 is preliminarily secured and the sizes of the spaces 472 between adjacent ones of the straight superposed parts 471 are preliminarily made even.

A plurality of pre-aligning members 81 are conveyed by a pair of conveying rollers 85 with the guidance of a guiding member 83 in a belt-conveyor manner, so that they can move in the same direction and in synch with the feeding of the wire assembly 47. Moreover, the advancing and retreating of the pre-aligning members 81 with respect to the spaces 472 of the wire assembly 47 are regulated by a pre-aligning member regulating member 84.

The pair of conveying rollers 85 is controlled, together with the aligning arrow driving devices 75, the driving device for the rotation of the core member 6, and the driving device for the feeding of the wire assembly 47, by the control device.

The pre-aligning members 81 have the same configuration as those described in the fourth embodiment.

The pre-aligning member regulating member 84 includes a general portion 840, an advancing portion 841, an aligning portion 842, and a retreating portion 843. The general portion 840 extends parallel to the feeding direction of the wire assembly 47. The aligning portion 842 also extends parallel to the feeding direction of the wire assembly 47, but lower than the general portion 840 by a predetermined distance. The advancing portion 841 extends obliquely downward with respect to the feeding direction of the wire assembly 47 so as to connect the general portion 840 with the aligning portion 842. The retreating portion 843 extends obliquely upward with respect to the feeding direction of the wire assembly 47 so as to connect the aligning portion 842 with the general portion 840.

The pre-aligning member regulating member 84 gradually lowers, at the advancing portion 841, the pre-aligning members 81 toward the wire assembly 47, thereby causing the pre-aligning members 81 to be gradually advanced into the spaces 472 of the wire assembly 47.

The pre-aligning member regulating member 84 horizontally moves, at the aligning portion 842, the pre-aligning members 81 which are completely inserted in the spaces 472 in the feeding direction of the wire assembly 47. Consequently, within the extent of the aligning portion 842, it is possible to align the straight portions 431 in each of the straight superposed parts 471 in the superposing direction and make the intervals between adjacent ones of the straight superposed parts 471 even.

The pre-aligning member regulating member 84 gradually raises, at the retreating portion 843, the pre-aligning members 81 away from the wire assembly 47, thereby causing the pre-aligning members 81 to be gradually retreated out of the spaces 472 of the wire assembly 47. Upon complete retreat of the pre-aligning members 81 from the spaces 472, the wire assembly 47 starts being rolled around the core member 6. Then, a pair of the aligning arrows 74 is inserted into the space 472 between those two of the straight superposed parts 471 which have just started to be rolled around the core member 6.

As above, by improving in advance both the accuracy of alignment of the straight portions 431 and the accuracy of the pitches between the straight superposed parts 471 of the wire assembly 47 with the pre-aligning members 81, it is possible to enhance the effects of improving with the aligning members 7 (i.e., the aligning arrows 74) both the accuracy of alignment of the straight portions 431 and the accuracy of the pitches between the straight superposed parts 471.

Other constitutions, operations, and effects are the same as those in the second embodiment.

In addition, in the stator coil manufacturing method of the first embodiment, it is also possible to employ a continuous rolling process as well as the preliminary alignment described in the fifth embodiment.

Sixth Embodiment

Figure 22:
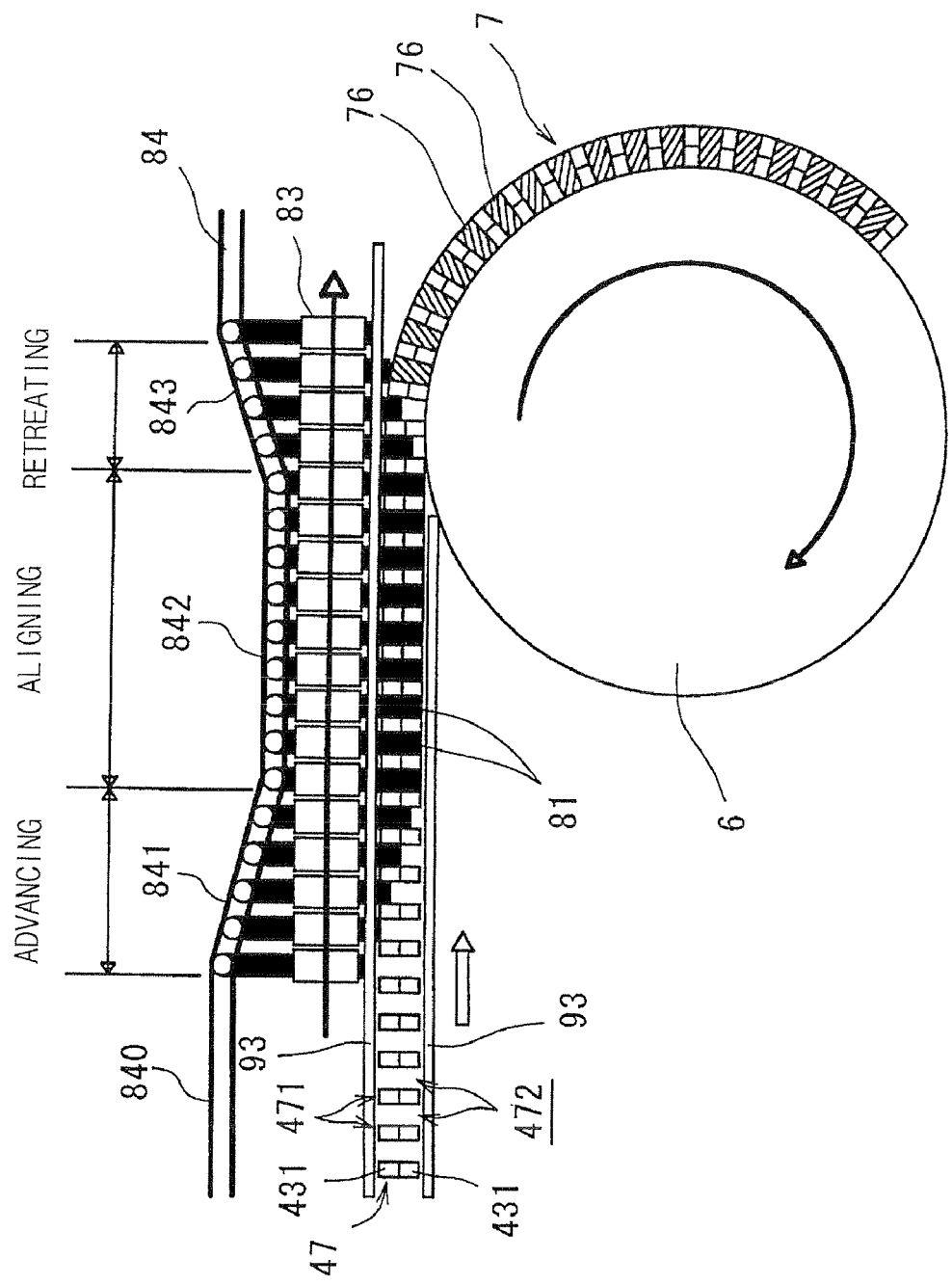
FIG. 22 is a schematic diagram illustrating a stator coil manufacturing method according to the sixth embodiment.
Figure 23:
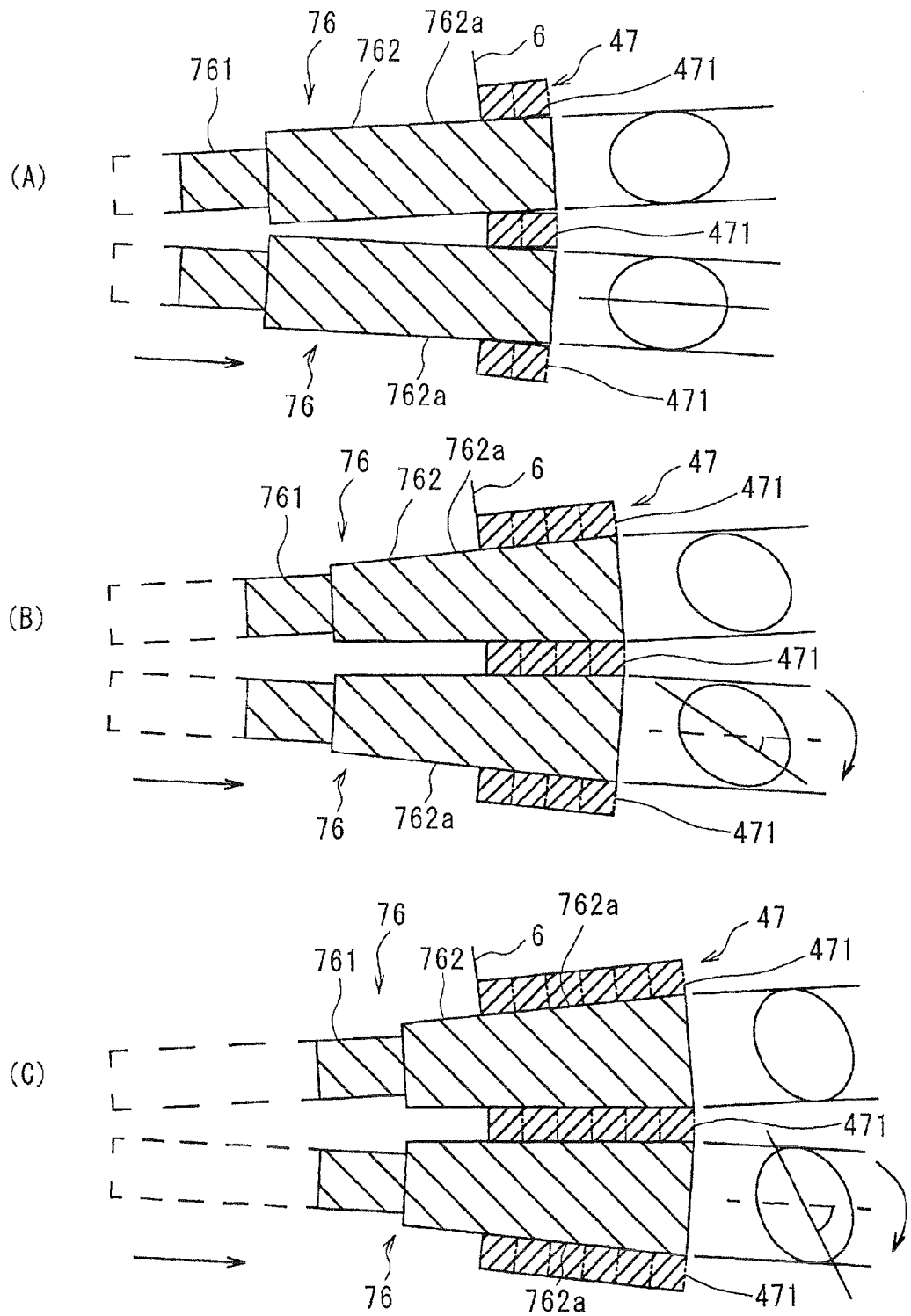
FIG. 23 are partial cross-sectional views showing the state of flattened taper pins, which are employed as aligning members in the stator coil manufacturing method according to the sixth embodiment, having been protruded from a core member.

The stator coil manufacturing method of the sixth embodiment, which is illustrated in FIGS. 22 and 23, is a such a modification of the stator coil manufacturing method of the fifth embodiment that: as the aligning members 7, flattened taper pins 76 are used each of which is employed instead of one of the pairs of the aligning arrows 74. In addition, the flattened taper pins 76 constitute taper pins of the present invention.

Each of the flattened taper pins 76 includes a cylindrical shaft portion 761 and a flattened taper portion 762 that is integrally formed with the shaft portion 761. The flattened taper portion 762 has a flattened conical side surface 762a and expands in width from its base end, which is on the shaft portion 761 side, to its tip end. That is, the flattened taper portion 762 has a circular outer circumference at its base end and an elliptical outer circumference at its tip end.

In the flattened taper portion 762, the diameter of the circular outer circumference of the base end is equal to the semi-minor axis of the elliptical outer circumference of the tip end. Moreover, the diameter of the circular outer circumference of the base end and the semi-minor axis of the elliptical outer circumference of the tip end are set to be substantially equal to the width (i.e., the width in the circumferential direction of the core member 6) of the spaces 472 of the wire assembly 47 in the first layer rolled around the core member 6. Furthermore, the semi-major axis of the elliptical outer circumference of the tip end is set to be substantially equal to or slightly larger than the width (i.e., the width in the circumferential direction of the core member 6) of the spaces 472 of the wire assembly 47 in the last layer (e.g., the fourth layer when the wire assembly 47 is rolled around the core member 6 by four turns) rolled around the core member 6.

In the stator coil manufacturing method of the sixth embodiment, the flattened taper pins 76 are protruded, in the same manner as in the rolling process of the second embodiment, from the outer circumferential surface of the core member 6 radially outward by a predetermined amount for each turn of the roiling of the wire assembly 47, thereby being respectively inserted into the spaces 472 in stages. In addition, from the second turn of the rolling of the wire assembly 47, the flattened taper pins 76 are further rotated by a predetermined angle for each turn of the rolling while being protruded by the predetermined amount.

The number of the flattened taper pins 76 is set to be equal to the number of the straight stacked parts 481 formed in the rolled wire assembly 48 (or the number of the spaces 472 formed in the rolled wire assembly 48). The flattened taper pins 76 are protruded from the outer circumferential surface of the core member 6 so as to respectively abut facing pairs of the side surfaces of the straight stacked parts 471.

Each of the flattened taper pins 76 is protruded from the outer circumferential surface of the core member 6 in stages. The predetermined amount, by which each of the flattened taper pins 76 is protruded in one stage (or for one turn of the rolling of the wire assembly 47), is set to be equal to the thickness (i.e., the thickness in the superposing direction) of the straight superposed parts 471 of the wire assembly 47. The number of the protruding stages for each of the flattened taper pins 76 is set to be equal to the predetermined number of turns by which the wire assembly 47 is rolled around the core member 6.

In protruding from the outer circumferential surface of the core member 6 in stages, each of the flattened taper pins 76 is rotated, from the second stage, by the predetermined angle in each stage of the protruding. The predetermined angle, by which each of the flattened taper pins 76 is rotated in each stage of the protruding, is set to be equal to the quotient of 90° divided by the result of subtracting 1 from the predetermined number of turns by which the wire assembly 47 is rolled around the core member 6. For example, in the case of the wire assembly 47 being rolled around the core member 6 by four turns to form the rolled wire assembly 48, each of the flattened taper pins 76 is rotated, from the second stage, by 30° (i.e., 90°/(4−1)) in each stage of the protruding.

In addition, in protruding from the outer circumferential surface of the core member 6 in stages, each of the flattened taper pins 76 may also be rotated, from the first stage, by the predetermined angle in each stage of the protruding. In this case, the predetermined angle, by which each of the flattened taper pins 76 is rotated in each stage of the protruding, may be set to be equal to the quotient of 90° divided by the predetermined number of turns by which the wire assembly 47 is rolled around the core member 6. For example, in the case of the wire assembly 47 being rolled around the core member 6 by four turns to form the rolled wire assembly 48, each of the flattened taper pins 76 may be rotated, from the first stage, by 22.5° (i.e., 90°/4) in each stage of the protruding.

The protruding and rotating of each of the flattened taper pins 76 is carried out by a taper pin driving device which is not shown in the figures. For each of the flattened taper pins 76, there is provided one taper pin driving device. In addition, each of the taper pin driving devices may be configured by suitably combining a motor, a gear mechanism, a rack and pinion mechanism, and an actuator. It is possible to control, by the control device, all of the taper pin driving devices, the driving device for the rotation of the core member 6, and the driving device for the feeding of the wire assembly 47 so that each of the flattened taper pins 76 can be made, at a predetermined timing, to protrude by the predetermined amount while being rotated by the predetermined angle in accord with the synchronized operations of feeding the wire assembly 47 and rotating the core member 6.

In the first turn of the rolling of the wire assembly 47, each of the flattened taper pins 76 is protruded from the outer circumferential surface of the core member 6 radially outward by one stage. In addition, in this stage, each of the flattened taper pins 76 is protruded without being simultaneously rotated. For each of the flattened taper pins 76, the width of that part of the flattened taper pin 76 which protrudes from the outer circumferential surface of the core member 6 (or the width of the flattened conical side surface 762a in the circumferential direction of the core member 6) is equal to both the diameter of the circular outer circumference of the base end and the semi-minor axis of the elliptical outer circumference of the tip end of the flattened taper portion 762 as well as substantially equal to the width (i.e., the width in the circumferential direction of the core member 6) of the spaces 472 of the wire assembly 47 in the first layer rolled around the core member 6. Consequently, the flattened conical side surface 762a of the flattened taper portion 762 of each of the flattened taper pins 76 comes to abut facing side surfaces of one adjacent pair of the straight superposed parts 471; thus, the straight superposed parts 471 in the first layer are positioned by the flattened taper pins 76 (see FIG. 23(A)). As a result, in the first layer of the wire assembly 47 which is rolled around the core member 6 by the first turn of the rolling, it is possible to secure the superposition of the straight portions 431 in each of the straight superposed parts 471 and thereby radially align the straight portions 431; it is also possible to make the intervals between adjacent ones of the straight superposed parts 471 even.

In the second turn of the rolling of the wire assembly 47, each of the flattened taper pins 76 is further protruded from the outer circumferential surface of the core member 6 radially outward by one stage. In addition, in this stage, each of the flattened taper pins 76 is protruded while being rotated by 30°. That is, each of the flattened taper pins 76 is brought into a state of having been rotated by 30° and protruded from the outer circumferential surface of the core member 6 by a total of two stages. For each of the flattened taper pins 76, the width of that part of the flattened taper pin 76 which protrudes from the outer circumferential surface of the core member 6 (or the width of the flattened conical side surface 762a in the circumferential direction of the core member 6) substantially conforms to the width (i.e., the width in the circumferential direction of the core member 6) of the spaces 472 of the wire assembly 47 in each of the first and second layers. Consequently, the flattened conical side surface 762a of the flattened taper portion 762 of each of the flattened taper pins 76 comes to abut facing side surfaces of one adjacent pair of the straight superposed parts 471 in each of the first and second layers; thus, the straight superposed parts 471 in each of the first and second layers are positioned by the flattened taper pins 76 (see FIG. 23(B)). As a result, in the first and second layers of the wire assembly 47 which are rolled around the core member 6 respectively by the first and second turns of the rolling, it is possible to secure the superposition of the straight portions 431 in each of the straight superposed parts 471 and thereby radially align the straight portions 431; it is also possible to make the intervals between adjacent ones of the straight superposed parts 471 even.

In the third turn of the rolling of the wire assembly 47, each of the flattened taper pins 76 is further protruded from the outer circumferential surface of the core member 6 radially outward by one stage. In addition, in this stage, each of the flattened taper pins 76 is protruded while being further rotated by 30°. That is, each of the flattened taper pins 76 is brought into a state of having been rotated by a total of 60° and protruded from the outer circumferential surface of the core member 6 by a total of three stages. For each of the flattened taper pins 76, the width of that part of the flattened taper pin 76 which protrudes from the outer circumferential surface of the core member 6 (or the width of the flattened conical side surface 762a in the circumferential direction of the core member 6) substantially conforms to the width (i.e., the width in the circumferential direction of the core member 6) of the spaces 472 of the wire assembly 47 in each of the first to the third layers. Consequently, the flattened conical side surface 762a of the flattened taper portion 762 of each of the flattened taper pins 76 comes to abut facing side surfaces of one adjacent pair of the straight superposed parts 471 in each of the first to the third layers; thus, the straight superposed parts 471 in each of the first to the third layers are positioned by the flattened taper pins 76 (see FIG. 23(C)). As a result, in the first to the third layers of the wire assembly 47 which are rolled around the core member 6 respectively by the first to the third turns of the rolling, it is possible to secure the superposition of the straight portions 431 in each of the straight superposed parts 471 and thereby radially align the straight portions 431; it is also possible to make the intervals between adjacent ones of the straight superposed parts 471 even.

With the flattened taper pins 76 of the sixth embodiment, it is possible to simplify the structure of the aligning members 7 in comparison with the case of employing the pairs of the aligning arrows 74.

Other constitutions, operations, and effects are the same as those in the fifth embodiment.

Seventh Embodiment

The stator coil manufacturing method of the seventh embodiment is such a modification of the stator coil manufacturing method of the first embodiment that: the wire assembly 47 is formed by stacking the twelve shaped wires without changing the order of them in the superposing direction of the straight superposed parts 471.

With such a method of forming the wire assembly 47, it is possible to simplify the assembling process of the wire assembly 47. Other constitutions, operations, and effects are the same as those in the first embodiment.

Eighth Embodiment

The stator coil manufacturing method of the eighth embodiment is obtained by modifying the assembling process and rolling process in the stator coil manufacturing method of the seventh embodiment. Hereinafter, the assembling process and rolling process of the eighth embodiment will be described.

In the assembling process, two sub-assemblies are prepared each of which is formed by stacking six shaped wires without changing the order of them in the superposing direction of the straight superposed parts 471. Then, the two sub-assemblies are rolled together, in the later-described rolling process, to form a single wire assembly in which twelve shaped wires are stacked without changing the order of them in the superposing direction of the straight superposed parts 471.

Next, in the rolling process, the two sub-assemblies are introduced, respectively, in two predetermined directions to the same place of the core member 6, and the core member 6 is rotated without changing the order of the shaped wires in the superposing direction of the straight superposed parts 471, thereby forming the rolled wire assembly 48.

In addition, in the above rolling process, it is also possible to introduce the two sub-assemblies, respectively, in two predetermined directions to two different predetermined places of the core member 6 and rotate the core member 6 to form the rolled wire assembly 48.

Moreover, in the above-described eighth embodiment, two sub-assemblies, each of which is formed by stacking six shaped wires, are prepared to form the wire assembly which is comprised of twelve shaped wires. However, the number of the shaped wires for forming each of the sub-assemblies is not limited to six. For example, it is possible to prepare three sub-assemblies each of which is formed by stacking four shaped wires; alternatively, it is also possible to prepare six sub-assemblies each of which is formed by stacking two shaped wires. Other constitutions, operations, and effects are the same as those in the first embodiment.

Other Embodiments

In the first to the eighth embodiments, an example of forming the wire assembly 47 is illustrated, wherein: ends of two shaped wires, which are obtained by shaping two electric wires, are joined to form one shaped-wire pair; and six shaped-wire pairs are assembled to form the wire assembly 47. However, the wire assembly 47 may also be formed in other manners.

For example, each of the shaped-wire pairs may be comprised of first and second wire portions that are not joined together; the first wire portion may be formed of a shaped wire to make up a first winding portion 40a; the second wire portion may also be formed of a shaped wire to make up a second winding portion 40b. Alternatively, each of the shaped-wire pairs may be comprised of first and second wire portions that are integrally formed. More specifically, the first and second wire portions may be formed of a single, continuous shaped wire to respectively make up the first and second winding portions 40a and 40b.

In the first and fourth embodiments, a pitch-based rolling process is illustrated, wherein: the wire assembly 47 is rolled around the cylindrical core member (or core bar) 6 while being fed to the core member 6 by one pitch (i.e., the interval between an adjacent pair of the straight superposed parts 471 in the wire assembly 47) at a time. However, the wire assembly 47 may also be rolled around the core member 6 while being fed to the core member 6 by two or more pitches at a time. That is to say, the pitch-based rolling process may be an N-pitch-based rolling process in which: the wire assembly 47 is rolled around the core member 6 while being fed to the core member 6 by N pitches at a time, where N is a natural number.

The invention claimed is:
1. A method of manufacturing a stator coil that is comprised of a plurality of phase windings, the method comprising:
   a shaping step for shaping electric wires to form a plurality of shaped wires;
   an assembling step for assembling the plurality of shaped wires to form a wire assembly; and
   a rolling step for rolling the wire assembly around a core member to form a rolled wire assembly,
   characterized in that:

each of the shaped wires includes a plurality of straight portions, which extend parallel to each other and are arranged in a longitudinal direction of the wire assembly, and a plurality of turn portions that connect, alternately on opposite sides of the straight portions, adjacent ones of the straight portions;

the shaped wires have, in the longitudinal direction of the wire assembly, a plurality of straight superposed parts each of which is formed by superposing a pair of the straight portions of the shaped wires;

the rolled wire assembly obtained in the rolling step has, in a circumferential direction of the rolled wire assembly, a plurality of straight stacked parts each of which is formed by stacking a predetermined number of the straight superposed parts in a radial direction; and in the rolling step, the wire assembly is rolled around the core member with aligning members being sequentially inserted into spaces formed between adjacent ones of the straight superposed parts of the wire assembly to secure the superposition of the straight portions in each of the straight superposed parts and make intervals between adjacent ones of the straight superposed parts even.

2. The method of manufacturing the stator coil as set forth in claim 1, further characterized in that:

in the rolling step, the wire assembly is rolled around the core member by a plurality of turns to form the rolled wire assembly; and the aligning members are stacked in each of the spaces in stages by inserting, from the radially outer side of the core member, one of the aligning members into each of the spaces for each turn of the rolling of the wire assembly.

3. The method of manufacturing the stator coil as set forth in claim 1, further characterized in that:

in the rolling step, the wire assembly is rolled around the core member by a plurality of turns to form the rolled wire assembly; and each of the aligning members is protruded, from the core member radially outward, into one of the spaces for each turn of the rolling of the wire assembly, thereby being inserted into the one of the spaces in stages.

4. The method of manufacturing the stator coil as set forth in claim 1, further characterized in that:

each of the aligning members is made up of at least one aligning arrow that is protruded from an outer circumferential surface of the core member radially outward to abut that side surface of a corresponding one of the straight superposed parts which is on the backward side in the rolling direction of the wire assembly.

5. The method of manufacturing the stator coil as set forth in claim 1, further characterized in that:

each of the aligning members is made up of a taper pin that is tapered so as to extend in width radially outward; and the taper pin is protruded from the core member radially outward while rotating for each turn of the rolling of the wire assembly.

6. The method of manufacturing the stator coil as set forth in claim 1, further characterized in that:

in the rolling step, when the wire assembly is on its way to be fed to the core member, a plurality of pre-aligning members are respectively inserted into consecutive ones of the spaces formed between adjacent ones of the straight superposed parts of the wire assembly to secure the superposition of the straight portions in each of those straight superposed parts which are each sandwiched by an adjacent pair of the pre-aligning members.

7. The method of manufacturing the stator coil as set forth in claim 6, further characterized in that:

the rolling step is a continuous rolling step for rolling the wire assembly around the core member while continuously feeding the wire assembly to the core member; and in the continuous rolling step, the pre-aligning members are advanced into and retreated out of the spaces while being moved in synch with the wire assembly.

8. The method of manufacturing the stator coil as set forth in claim 6, further characterized in that:

the rolling step is a pitch-based rolling step for rolling the wire assembly around the core member while feeding the wire assembly to the core member by N times the interval between an adjacent pair of the straight superposed parts of the wire assembly at a time, where N is a natural number; and in the pitch-based rolling step, a plurality of processes are repeated which include a pre-aligning member insertion process for inserting the pre-aligning members into the spaces of the wire assembly when the wire assembly is sopped, an advancing process for advancing the wire assembly together with the pre-aligning members by N times the interval between an adjacent pair of the straight superposed parts of the wire assembly, a pre-aligning member removal process for removing the pre-aligning members out of the spaces of the wire assembly, and a retreating process for retreating the pre-aligning members by N times the interval between an adjacent pair of the straight superposed parts of the wire assembly.

9. The method of manufacturing the stator coil as set forth in claim 8, further characterized in that:

in the pitch-based rolling process, a position keeping member insertion process is performed, following the advancing process, for inserting position keeping members into other ones of the spaces of the wire assembly than those of the spaces in which the pre-aligning members are inserted;

a position keeping member removal process is performed, following the pre-aligning member insertion process, for removing the position keeping members out of the other spaces of the wire assembly;

the pre-aligning member removal process, the retreating process, and the pre-aligning member insertion process are performed with the position keeping members inserted in the other spaces of the wire assembly; and the advancing process is performed with the position keeping members removed out of the other spaces of the wire assembly.

* * * * *